(12) United States Patent
Oosaki et al.

(10) Patent No.: US 8,991,821 B2
(45) Date of Patent: Mar. 31, 2015

(54) IMAGE READING APPARATUS HAVING CONVEYANCE ROLLERS CONVEYING ORIGINAL SHEET

(71) Applicants: Masayoshi Oosaki, Nagoya (JP); Takashi Maeda, Nagoya (JP); Muneaki Takahata, Toyoake (JP); Yoshinori Osakabe, Seto (JP)

(72) Inventors: Masayoshi Oosaki, Nagoya (JP); Takashi Maeda, Nagoya (JP); Muneaki Takahata, Toyoake (JP); Yoshinori Osakabe, Seto (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/039,150

(22) Filed: Sep. 27, 2013

(65) Prior Publication Data

US 2014/0138897 A1 May 22, 2014

(30) Foreign Application Priority Data

Nov. 20, 2012 (JP) ................................. 2012-254697

(51) Int. Cl.
  *B65H 5/34* (2006.01)
  *B65H 7/20* (2006.01)
  *B65H 3/06* (2006.01)

(52) U.S. Cl.
  CPC ... *B65H 7/20* (2013.01); *B65H 3/06* (2013.01)
  USPC ............................ 271/270; 358/498; 399/370

(58) Field of Classification Search
  USPC ............................ 271/270; 358/498; 399/370
  See application file for complete search history.

(56) References Cited

U.S. PATENT DOCUMENTS

| 4,713,674 | A | * | 12/1987 | Giezeman et al. ............ 399/390 |
| 4,714,941 | A | * | 12/1987 | Yamagishi et al. ............. 399/86 |
| 5,915,158 | A | * | 6/1999 | Minagawa et al. ........... 399/370 |
| 8,121,510 | B2 | * | 2/2012 | Roppongi ....................... 399/82 |
| 8,693,072 | B2 | * | 4/2014 | Osakabe et al. .............. 358/498 |
| 2009/0027740 | A1 | * | 1/2009 | Kang ............................ 358/488 |
| 2014/0138897 | A1 | * | 5/2014 | Oosaki et al. ................ 271/3.16 |

FOREIGN PATENT DOCUMENTS

JP    H11-127301 A    5/1999
JP    2012-182662 A   9/2012

\* cited by examiner

*Primary Examiner* — Jeremy R Severson
(74) *Attorney, Agent, or Firm* — Scully, Scott, Murphy & Presser, P.C.

(57) ABSTRACT

In an image reading apparatus, it is judged whether an original sheet is a first sheet type, whose sheet length is longer than or equal to a first conveyance distance and shorter than a second conveyance distance, and a second sheet type, whose sheet length is longer than or equal to the second conveyance path, the first conveyance distance being a distance between a first conveyance roller and a second conveyance roller, the second conveyance distance being a distance between a supply roller and the second conveyance roller. At least one of a leading-edge arriving timing; a trailing-edge arriving timing; and a sub-scanning magnification is set dependently on the judged result. An image is read from the original sheet by using an image reading unit and a conveyance unit based on the set at least one of the leading-edge arriving timing; trailing-edge arriving timing; and sub-scanning magnification.

9 Claims, 13 Drawing Sheets

FIG. 8

| Sheet Type | | CIS | Temperature Range/°C | Sub-scanning magnification correction values (%) | | | | Temperature Range/°C | Leading edge/trailing edge correction values (mm) | | | |
|---|---|---|---|---|---|---|---|---|---|---|---|---|
| | | | | ~10 | 10~20 | 20~30 | 30~ | | ~10 | 10~20 | 20~30 | 30~ |
| SECOND SHEET TYPE | FOURTH SHEET TYPE | FIRST CIS | CORRESPONDING TO HB1(T) | 100.20% | 100.30% | 100.40% | 100.50% | CORRESPONDING TO PA1(T)·PB1(T) | -0.3 | -0.5 | -0.7 | -0.9 |
| | | SECOND CIS | CORRESPONDING TO HB4(T) | 100.90% | 101.00% | 101.10% | 101.20% | CORRESPONDING TO PC4(T)·PD4(T) | 0.2 | 0.0 | -0.2 | -0.4 |
| | THIRD SHEET TYPE | FIRST CIS | CORRESPONDING TO HB2(T) | 99.20% | 99.30% | 99.40% | 99.50% | CORRESPONDING TO PA2(T)·PB2(T) | 0.2 | 0.0 | -0.2 | -0.4 |
| | | SECOND CIS | CORRESPONDING TO HB5(T) | 99.90% | 100.00% | 100.10% | 100.20% | CORRESPONDING TO PC5(T)·PD5(T) | 0.7 | 0.5 | 0.3 | 0.1 |
| FIRST SHEET TYPE | | FIRST CIS | CORRESPONDING TO HB3(T) | 98.70% | 98.80% | 98.90% | 99.00% | CORRESPONDING TO PA3(T)·PB3(T) | 0.3 | 0.1 | -0.1 | -0.3 |
| | | SECOND CIS | CORRESPONDING TO HB6(T) | 99.40% | 99.50% | 99.60% | 99.70% | CORRESPONDING TO PC6(T)·PD6(T) | 0.8 | 0.6 | 0.4 | 0.2 |

IMAGE READING APPARATUS HAVING CONVEYANCE ROLLERS CONVEYING ORIGINAL SHEET

CROSS REFERENCE TO RELATED APPLICATION

This application claims priority from Japanese Patent Application No. 2012-254697 filed Nov. 20, 2012. The entire content of this priority application is incorporated herein by reference.

TECHNICAL FIELD

The present invention relates to an image reading apparatus for reading an image from an original sheet while conveying the original sheet.

BACKGROUND

There is conventionally known an image reading apparatus of a type that reads an image from an original sheet while conveying the original sheet, such as a Japanese Patent Application Publication No. 11-127301.

SUMMARY

It is conceivable that an image reading apparatus has a supply roller, first conveyance rollers, and second conveyance rollers in this order along a conveyance path in a conveying direction from its upstream side to its downstream. The supply roller sends out an original sheet placed on a sheet feed tray one sheet by one sheet to the conveyance path. This image reading apparatus can convey the original sheet by using the rollers if the length of the original sheet in the sheet conveying direction is longer than both of the distance along the conveyance path between the supply roller and the first conveyance rollers and the distance along the conveyance path between the first and second conveyance rollers.

According to this conceivable image reading apparatus, however, the conveyance speed of the original sheet will possibly vary dependently on the length of the original sheet along the conveyance path relative to the positions of the supply roller and the first and second conveyance rollers. So, the read out image data will possibly expand or contract in the conveying direction dependently on the size of the original sheet.

An object of the present invention is therefore to provide an image reading apparatus that reads an image from an original sheet while conveying the original sheet and that can restrain expansion and contraction of image data in the conveying direction.

In order to attain the above and other objects, the invention provides an image reading apparatus, including: a sheet feed tray; a supply roller; the conveyance unit; a discharged-sheet receiving unit; an image reading unit; and a control device. The supply roller is configured to rotate while being in contact with an original sheet placed on the sheet feed tray and to send out the original sheet one sheet by one sheet to a conveyance path. The conveyance unit includes a first conveyance roller and a second conveyance roller and configured to convey, along the conveyance path, the original sheet that has been sent out by the supply roller to the conveyance path, the conveyance unit conveying the original sheet by using the first conveyance roller and the second conveyance roller in succession in this order. The original sheet that has been conveyed by the conveyance unit is discharged into the discharged-sheet receiving unit. The image reading unit is disposed at a reading position along the conveyance path between the first conveyance roller and the second conveyance roller and configured to read an image, in a main scanning direction, from the original sheet conveyed by the conveyance unit at the reading position. The control device is configured to: judge whether the original sheet is either one of a first sheet type, whose sheet length in a conveying direction along the conveyance path is longer than or equal to a first conveyance distance and shorter than a second conveyance distance, and a second sheet type, whose sheet length in the conveying direction along the conveyance path is longer than or equal to the second conveyance path, the first conveyance distance being a distance between the first conveyance roller and the second conveyance roller along the conveyance path, the second conveyance distance being a distance between the supply roller and the second conveyance roller along the conveyance path; set at least one of a leading-edge arriving timing; a trailing-edge arriving timing; and a sub-scanning magnification dependently on the judged result, the leading-edge arriving timing indicating a timing when a leading edge of the original sheet in the conveying direction reaches the reading position, the trailing-edge arriving timing indicating a timing when a trailing edge of the original sheet in the conveying direction reaches the reading position, the sub-scanning magnification indicating an enlargement or reduction ratio in a sub-scanning direction orthogonal to the main scanning direction that is to be applied onto an image to be read by the image reading unit; and read an image from the original sheet by using the image reading unit and the conveyance unit based on the set at least one of the leading-edge arriving timing; the trailing-edge arriving timing; and the sub-scanning magnification.

BRIEF DESCRIPTION OF THE DRAWINGS

The particular features and advantages of the invention as well as other objects will become apparent from the following description taken in connection with the accompanying drawings, in which:

FIG. 8 shows a table showing temperature-dependent characteristics of respective parameters;

DETAILED DESCRIPTION

Figure 1:
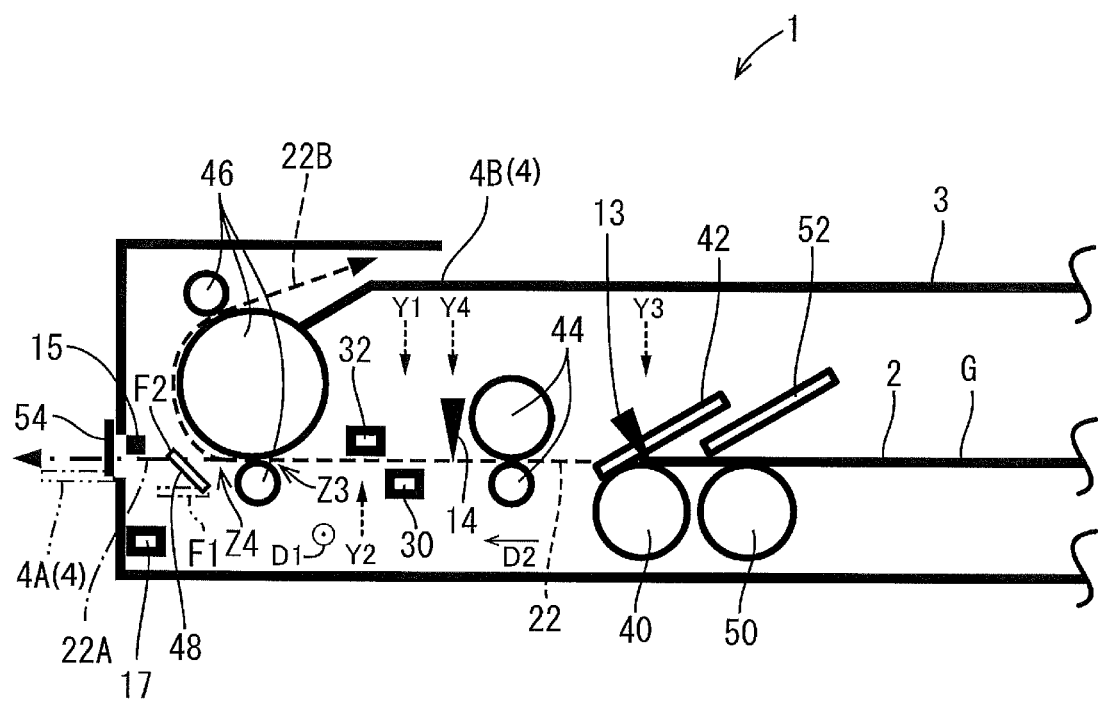
FIG. 1 is a schematically cross-sectional view of an image reading apparatus according to a first embodiment of the present invention.

An image reading apparatus according to embodiments of the invention will be described while referring to the accompanying drawings wherein like parts and components are designated by the same reference numerals to avoid duplicating description.

First Embodiment

A first embodiment will be described with reference to FIGS. 1 to 8.

1. Mechanical Configuration of Image Reading Apparatus

As shown in FIG. 1, an image reading apparatus 1 is a sheet-feed scanner that conveys, one sheet by one sheet, a plurality of original sheets G placed by a user on a sheet feed tray 2 to a sheet discharge portion 4, and reads a conveyed original sheet G by using a first CIS 30 and a second CIS 32 contained in a main body 3 of the image reading apparatus 1.

In the main body 3 of the image reading apparatus 1, a conveyance path 22 is provided to connect the sheet feed tray 2 to the sheet discharge portion 4. Around the conveyance path 22, the following components are provided: a sheet feed roller 40, a separation pad 42, first conveyance rollers 44, second conveyance rollers 46, a switching plate 48, the first CIS 30, the second CIS 32, a front sensor (referred to as F sensor, hereinafter) 13, and a rear sensor (referred to as R sensor, hereinafter) 14.

The sheet feed roller 40 rotates, while being in contact with the original sheet G placed on the sheet feed tray 2, thereby sending out the original sheet G into the main body 3. More specifically, the original sheets G are separated from one another due to a friction force of the separation pad 42, and are sent out sheet one by one to the conveyance path 22.

The sheet feed tray 2 is provided with a pickup roller 50 and a pickup pad 52, which confront each other across the original sheet G placed on the sheet feed tray 2. The pickup roller 50 and the pickup pad 52 assist the sheet feed roller 40 and the separation pad 42 in sending the original sheet G placed on the sheet feed tray 2 to the conveyance path 22.

The conveyance rollers 44 and 46 are driven by a motor M (Refer to FIG. 3) to convey, along the conveyance path 22, the original sheet G that has been drawn into the main body 3. Along the conveyance path 22, the first conveyance rollers 44 are disposed on the upstream side relative to the second conveyance rollers 46 in a conveyance direction D2, in which the original sheet G is conveyed. The conveyance direction D2 is also referred to as a "sub-scanning direction D2." A first conveyance distance L1 is defined as a distance between the first conveyance rollers 44 and the second conveyance rollers 46 along the conveyance path 22. A second conveyance distance L2 is defined as a distance between the sheet feed roller 40 and the second conveyance rollers 46 along the conveyance path 22. Original sheets G that can be conveyed by the image reading apparatus 1 of the present embodiment have sheet lengths, along the conveyance path 22, that are longer than the first conveyance distance L1.

The first CIS 30 is disposed at a first reading position Y1 that is between the first conveyance rollers 44 and the second conveyance rollers 46 on the conveyance path 22. The first CIS 30 is for reading the front surface of a conveyed original sheet G at the first reading position Y1. The second CIS 32 is disposed at a second reading position Y2 that is between the first reading position Y1 and the second conveyance rollers 46 on the conveyance path 22. The second CIS 32 is for reading a back surface of a conveyed original sheet G at the second reading position Y2.

The second conveyance rollers 46 are for discharging the original sheet G onto the sheet discharge portion 4. The sheet discharge portion 4 includes a sheet discharge tray 4A and a sheet discharge tray 4B.

The switching plate 48 is disposed on the opposite side of the second conveyance rollers 46 with respect to the conveyance path 22. The switching plate 48 switches between a first posture F1, at which the switching plate 48 extends along a straight path (referred to as S path, hereinafter) 22A to the sheet discharge tray 4A, and a second posture F2, at which the switching plate 48 extends along a U-turn path (referred to as U path, hereinafter) 22B to the sheet discharge tray 4B.

The S path 22A and the U path 22B diverge from the conveyance path 22 at a position Z4 that is on the downstream side of a position Z3. At the position Z3, the conveyance path 22 reaches the second conveyance rollers 46 from the upstream side of the second conveyance rollers 46 in the conveyance direction D2. At the position Z4, the conveyance path 22 confronts the switching plate 48. The S path 22 extends substantially linearly, and is used for conveying small sheets such as business cards and postcards. Part of the U path 22B is bent or curved along the periphery of one of the second conveyance rollers 46, and is used for conveying large sheets such as A4-size sheets.

The sheet discharge tray 4A is configured from a discharge tray plate 54 that is part of an outer case of the main body 3. The sheet discharge tray 4B is formed by an upper portion of the outer case of the main body 3.

The discharge tray plate 54 is pivotable to the main body 3. The discharge tray plate 54 pivots from a closed state indicated by a solid line in FIG. 1 to an opened state indicated by a two-dot chain line in FIG. 1. In the opened state, the discharge tray plate 54 serves as the sheet discharge tray 4A. The switching plate 48 switches between the first and second postures F1 and F2 in interlocking relationship with the discharge tray plate 54. That is, when the discharge tray plate 54 becomes the opened state, the switching plate 48 switches to the first posture F1. When the discharge tray plate 54 becomes the closed state, the switching plate 48 switches to the second posture F2. In the main body 3, a tray plate detection sensor 15 is provided to detect the opened and closed states of the discharge tray plate 54. The tray plate detection sensor 15 is being ON when the discharge tray plate 54 is in the closed state, and is being OFF when the discharge tray plate 54 is in the opened state.

When the switching plate 48 takes the first posture F1 indicated by a two-dot chain line in FIG. 1, the original sheet G is conveyed along the S path 22A, and is discharged onto the sheet discharge tray 4A. On the other hand, when the switching plate 48 takes the second posture F2 indicated by a solid line in FIG. 1, the original sheet G is conveyed along the U path 22B, and is discharged onto the sheet discharge tray 4B. In this way, the pickup roller 50, the sheet feed roller 40, the first conveyance rollers 44, and the second conveyance rollers 46 constitute a conveyance unit 56 for conveying, along the conveyance path 22, the original sheet G that has been placed on the sheet feed tray 2.

The front sensor 13 is disposed at a detection position Y3 in the sheet feed tray 2. The front sensor 13 is being ON when an original sheet G is placed on the sheet feed tray 2, and is being OFF when no original sheet G is placed on the sheet feed tray 2. The rear sensor 14 is disposed at a detection position Y4 between the first conveyance rollers 44 and the first reading position Y1 along the conveyance path 22. The rear sensor 14 is being ON when an original sheet G is passing through the detection position Y4 on the conveyance path 22, and is being OFF when no original sheet G is passing through the detection position Y4. Thus, the rear sensor 14 detects an original sheet G passing through the detection position Y4.

Figure 2:
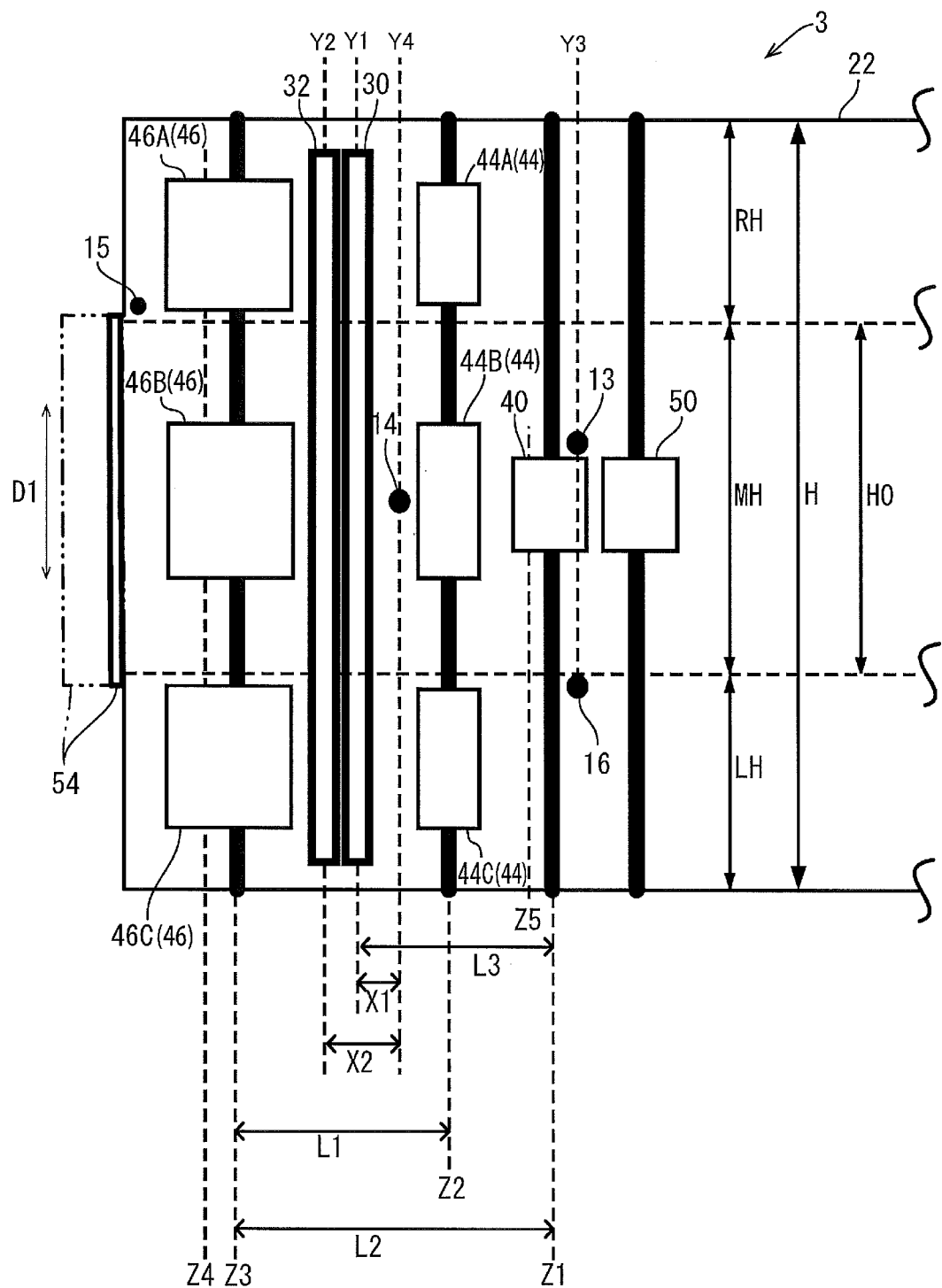
FIG. 2 is a schematically top view of the inside of a main body of the image reading apparatus shown in FIG. 1.

Furthermore, in the image reading apparatus 1, a sheet size detection sensor 16, a temperature sensor 17, an operation unit 11, and a display unit 12 are provided. The sheet size detection sensor 16 is disposed at the detection position Y3 in the conveyance direction D2 similarly to the front sensor 13 as shown in FIG. 2. The sheet size detection sensor 16 is being ON when an original sheet G placed on the sheet feed tray 2 is a large sheet, and is being OFF when the original sheet G is a small sheet. The temperature sensor 17 is for detecting a temperature T inside the apparatus 1. The operation unit 11 (See FIG. 3) includes a power switch and various setting buttons, and receives operation instructions and reading settings inputted by a user. The display unit 12 (See FIG. 3) includes an LED or liquid crystal display, and is for displaying the state of the image reading apparatus 1.

FIG. 2 is a top view of the inside of the main body 3. The conveyance path 22 has a predetermined width in a main scanning direction D1 which is substantially orthogonal to the conveyance direction (sub-scanning direction) D2. The entire region of the conveyance path 22 in the main scanning direction D1 is referred to as a "conveyance region H." When an original sheet G is placed on the sheet feed tray 2 that is in connection with the conveyance path 22, the original sheet G is positioned with its center in the main scanning direction D1 being aligned with the center of the conveyance path 22 in the main scanning direction D1. When conveying a large sheet G on the conveyance path 22, the entire part of the conveyance region H of the conveyance path 22 in the main scanning direction D1 is used to convey the large sheet G. When conveying a small sheet G, only a center region MH of the conveyance region H is used to convey the small sheet G. The center region MH is part of the conveyance region H that is located in the center of the conveyance region H in the main scanning direction D1, and has a width H0 in the main scanning direction D1. Hereinafter, in the conveyance region H, a region on the right side of the center region MH is referred to as a right region RH, and a region on the left side of the center region MH as a left region LH, as viewed from the upstream side in the conveyance direction D2.

The width of the discharge tray plate 54 in the main scanning direction D1 is substantially equal to the width of the center region MH. Accordingly, onto the sheet discharge tray 4A formed by the discharge tray plate 54, a small sheet that is conveyed only by the center region MH is discharged. The front sensor 13 and the rear sensor 14 are disposed near the center of the center region MH in the main scanning direction D1 at the detection position Y3 and Y4, respectively. At the detection position Y3, the sheet size detection sensor 16 is disposed in the left region LH at a position near to the boundary between the left region LH and the center region MH.

The pickup roller 50 and the sheet feed roller 40 are each made up from one roller that is disposed in the center region MH in the main scanning direction D1. Each of the first conveyance rollers 44 includes three roller portions 44A, 44B, and 44C that are arranged to rotate around the same rotation axis extending in the main scanning direction D1 and in synchronization with each other. The three roller portions 44A, 44B, and 44C constituting each of the first conveyance rollers 44 are disposed in the right region RH, the center region MH, and the left region LH, respectively. Similarly, each of the second conveyance rollers 46 includes three roller portions 46A, 46B, and 46C that are arranged to rotate around the same rotation axis extending in the main scanning direction D1 and in synchronization with each other. The three roller portions 46A, 46B, and 46C constituting each of the second conveyance rollers 46 are disposed in the right region RH, the center region MH, and the left region LH, respectively.

Figure 7:
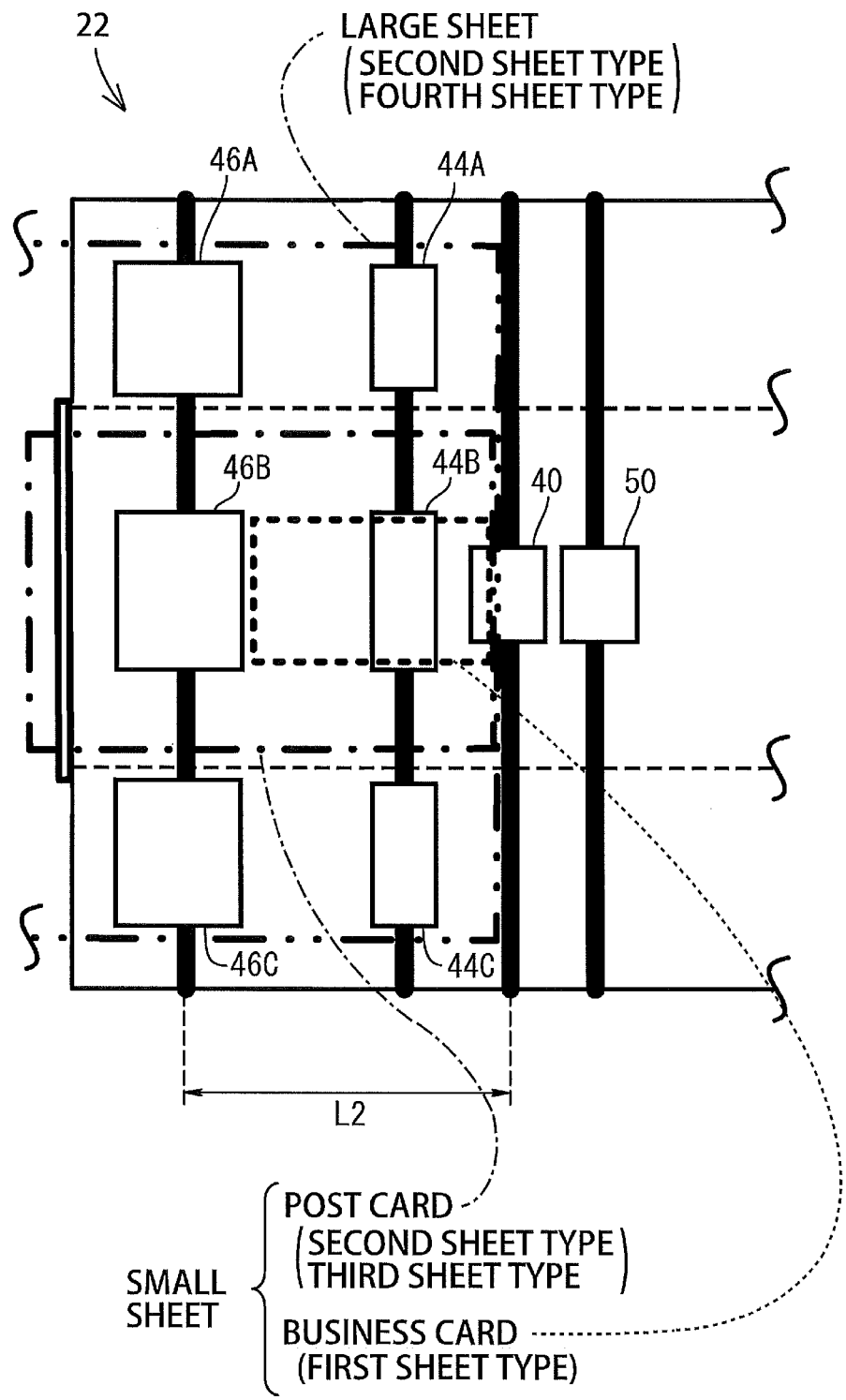
FIG. 7 illustrates positional relationship between conveyance rollers and the length and width of each type of original sheet.

When a small sheet such as a business card indicated by a dashed line in FIG. 7 or a postcard indicated by a one-dot chain line is conveyed by the first conveyance rollers 44 and the second conveyance rollers 46, the small sheet is conveyed by one of the three roller portions (roller portion 44B, 46B) in each of the first and second conveyance rollers 44 and 46 that are disposed in the center region MH. On the other hand, a large sheet such as an A4-size sheet indicated by a two-dot chain line in FIG. 7 is conveyed by more than one roller portion in each of the first and second conveyance rollers 44 and 46. More specifically, a large sheet such as an A4-size sheet is conveyed by all of the three roller portions 44A-44C and 46A-46C that constitute each of the first and second conveyance rollers 44 and 46.

2. Electrical Configuration of Image Reading Apparatus

Figure 3:
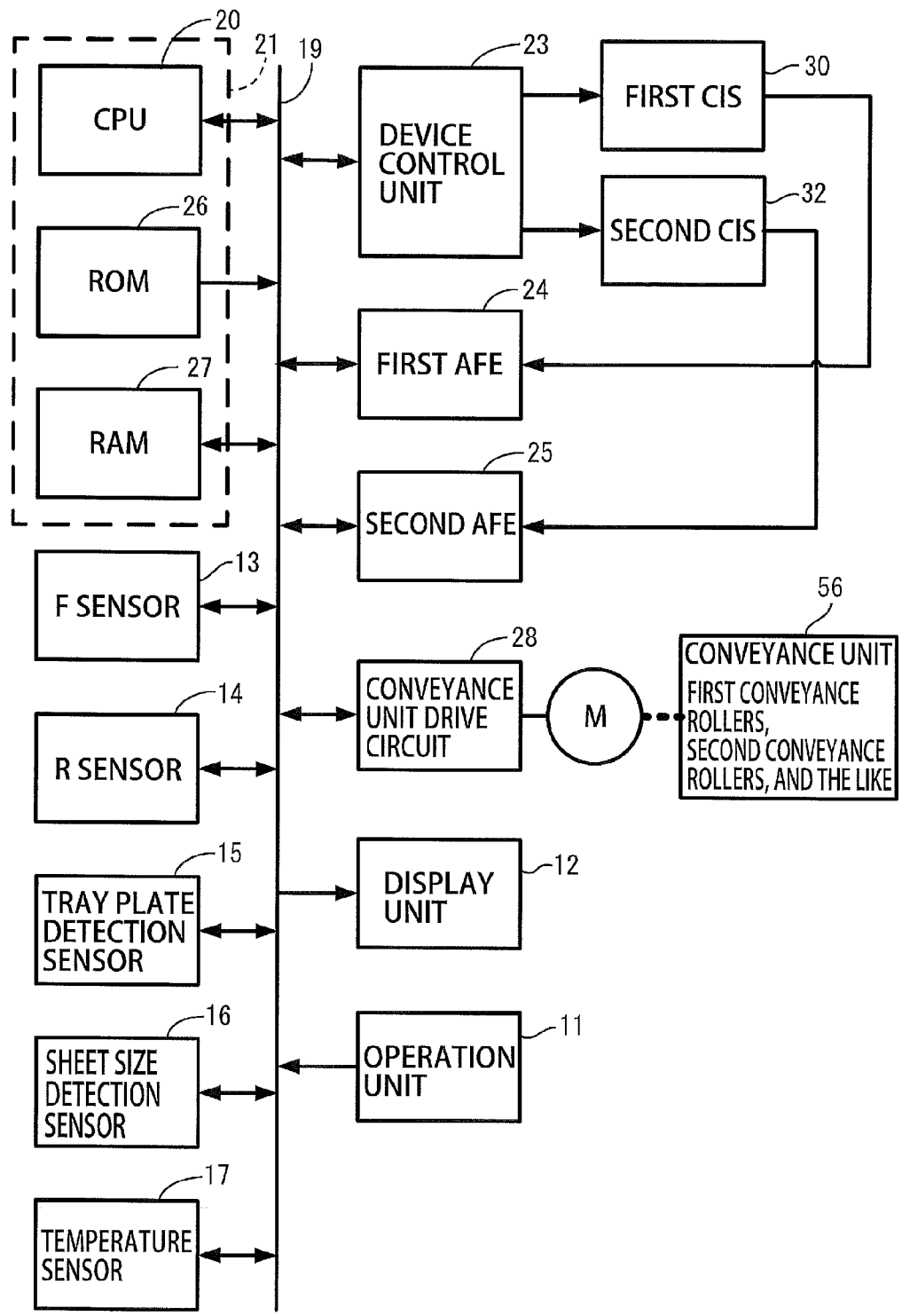
FIG. 3 is a block diagram schematically showing the electrical configuration of the image reading apparatus.

As shown in FIG. 3, the image reading apparatus 1 includes a central processing unit (referred to as CPU, hereinafter) 20, a ROM 26, a RAM 27, a device control unit 23, a first analog front end (referred to as AFE, hereinafter) 24, a second AFE 25, and a conveyance unit drive circuit 28. To the above components, the operation unit 11, the display unit 12, and the sensors 13 to 17 are connected via a bus 19. As indicated by a dotted line 21 in FIG. 3, the CPU 20, the ROM 26, and the RAM 27 constitute a control device for controlling the entire part of the image reading apparatus 1.

The ROM 26 is prestored with various programs for controlling an operation of the image reading apparatus 1. By executing the programs read from the ROM 26, the CPU 20 controls each part in the image reading apparatus 1 and also performs a conveyance reading process according to the present embodiment as described later. The ROM 26 is further prestored with: the first conveyance distance L1 and second conveyance distance L2; the width H0 of the center region MH; and first step numbers PA, second step numbers PB, third step numbers PC, fourth step numbers PD, and sub-scanning magnifications HB, which will be described later.

The device control unit 23 is connected to the CISs 30 and 32. Based on instructions outputted from the CPU 20, the device control unit 23 transmits reading control signals to the CISs 30 and 32. Each of the CISs 30 and 32 reads a corresponding surface of an original sheet G based on the reading control signal inputted from the device control unit 23.

The first AFE 24 is connected to the first CIS 30. The first AFE 24 converts analog read data outputted from the first CIS 30 into digital read data, i.e., digital gradation data. The first AFE 24 stores the converted gradation data in the RAM 27 via the bus 19. The second AFE 25 is connected to the second CIS 32. The second AFE 25 converts analog read data outputted from the second CIS 32 into digital read data, and stores the digital read data in the RAM 27 via the bus 19.

The conveyance unit drive circuit 28 is connected to the motor M. Based on a pulse signal inputted from the CPU 20, the conveyance unit drive circuit 28 drives the motor M to rotate. Upon receiving one pulse in the pulse signal, the motor M is driven to rotate by a predetermined one step's worth of rotation angle. As the motor M is driven by one step, the rollers constituting the conveyance unit 56 are rotated by predetermined angles, thereby conveying an original sheet G by a predetermined one step's worth of distance on the conveyance path 22.

To convey the original sheet G, the CPU 20 transmits a pulse signal to the conveyance unit drive circuit 28, whereupon the conveyance unit 56 conveys the original sheet G by a distance that is equivalent to a value determined by multiplying the number of pulses in the pulse signal and the predetermined one step's worth of distance. Hereinafter, the number of pulses in the pulse signal transmitted from the CPU 20 to the motor M is referred to as a step number.

In the conveyance unit 56, in order to prevent an original sheet G conveyed along the conveyance path 22 from being wrinkled, when an original sheet G, which has been sent out by the sheet feed roller 40 to the conveyance path 22, starts being conveyed by the first or second conveyance rollers 44, 46, as shown in FIGS. 10A-11B, the first conveyance rollers 44 apply the original sheet G with a driving force F1 for moving the original sheet G in the conveyance direction D2, the second conveyance rollers 46 apply the original sheet G with a driving force F3 for moving the original sheet G in the conveyance direction D2, and the sheet feed roller 40 applies the original sheet G with a restraining force F2 for restraining the original sheet G from moving in the conveyance direction D2.

Figure 10A:
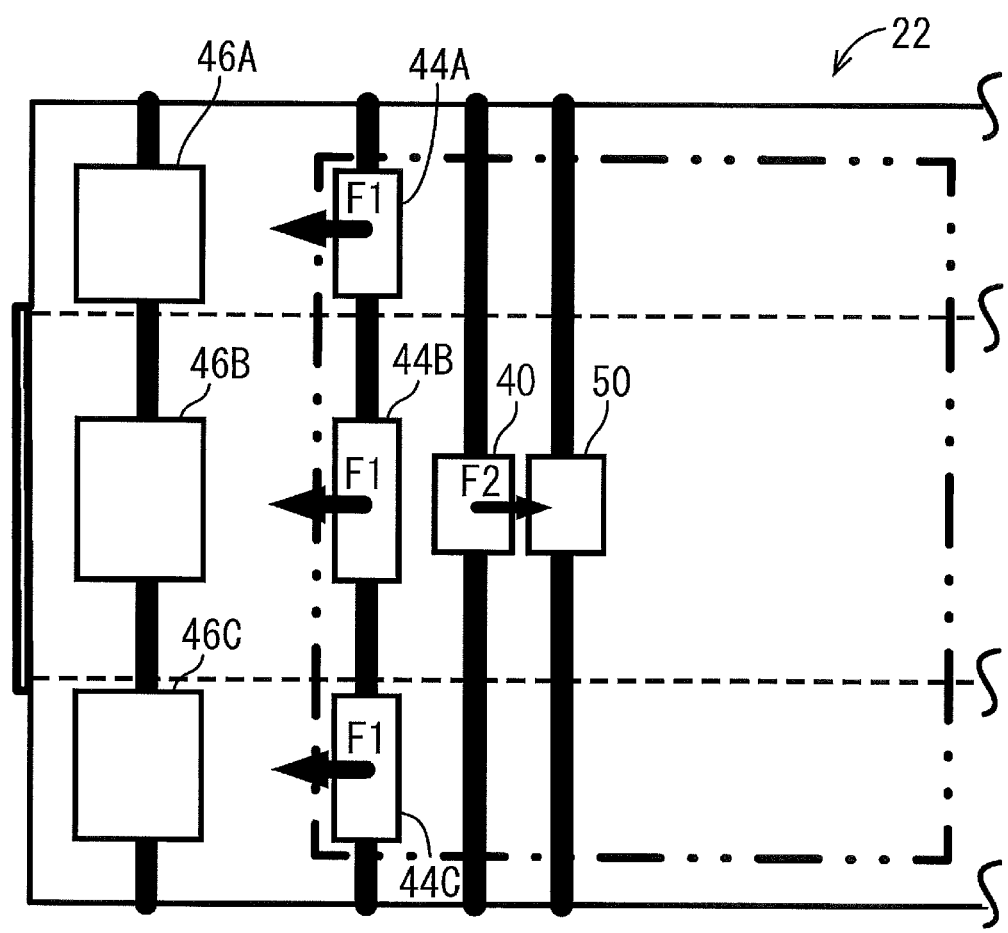
FIGS. 10A and 10B show various forces applied from conveyance unit to original sheets while the original sheets are being conveyed.
Figure 10B:
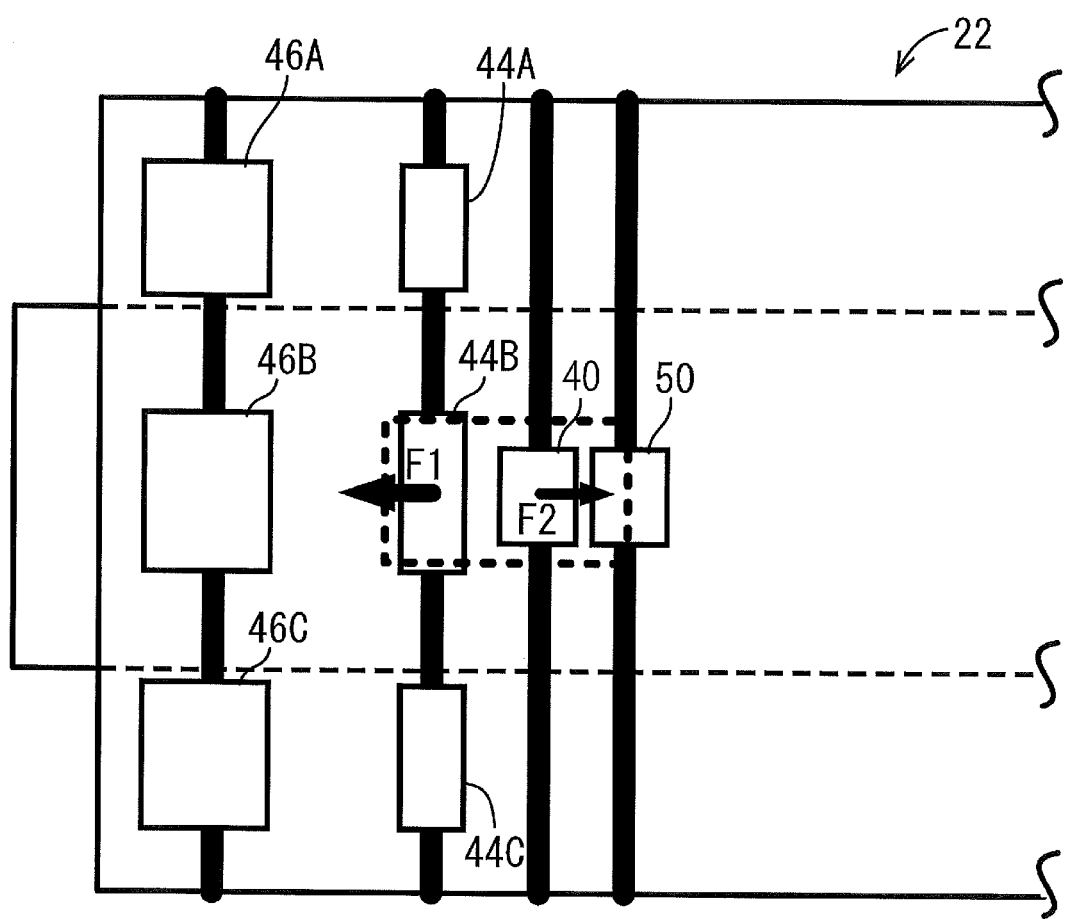

As shown in FIG. 10A, a large sheet such as an A4-size sheet is conveyed by the three roller portions 44A-44C constituting each of the first conveyance rollers 44. Therefore, the large sheet G is subjected to three driving forces F1 and one restraining force F2 when the large sheet G is conveyed. Contrarily, as shown in FIG. 10B, a small sheet such as a business card or postcard is conveyed by the one roller portion 44B in each of the first conveyance rollers 44. Therefore, the small sheet G is subjected to one driving force F1 and one restraining force F2 when the small sheet G is conveyed. That is, the number of the roller portions in the first conveyance rollers 44 that are used for conveying the small sheet G is fewer than that of the roller portions used for conveying the large sheet G. Therefore, in the total of the driving and restraining forces, the restraining force F2 has a greater impact on a small sheet than on a large sheet.

Therefore, in the case of a small sheet such as a business card indicated by a dashed line in FIG. 7 or a postcard indicated by a one-dot chain line, leading-edge arrival timings ST, at which a conveyance-direction leading edge of an original sheet G reaches the reading positions Y1 and Y2, and trailing-edge arrival timings KT, at which a conveyance-direction trailing edge of the original sheet G reaches the reading position Y1 and Y2, are delayed compared with a large sheet such as an A4-size sheet indicated by a two-dot chain line in FIG. 7. Moreover, the length of time required by one unit length of a small sheet to pass through each of the reading positions Y1 and Y2 is longer than that required by one unit length of a large sheet to pass through each of the reading positions Y1 and Y2. Therefore, the sub-scanning magnifications HB for the CISs 30 and 32 need to be smaller for small sheets than for large sheets. The sub-scanning magnifications HB represent enlargement or reduction ratios that should be applied to: reading or scanning operations by the CISs 30 and 32 in the sub-scanning direction D2; or read data resulting from the reading or scanning operations by the CISs 30 and 32 in the sub-scanning direction D2.

An original sheet G of a first sheet type such as a business card indicated by a dashed line in FIG. 7, whose sheet length is shorter than the second conveyance distance L2, separates away from the sheet feed roller 40 before the original sheet G reaches the position Z3. Contrarily, an original sheet G of a second sheet type such as a postcard indicated by a one-dot chain line in FIG. 7 or an A4-size sheet indicated by a two-dot chain line, whose sheet length is greater than or equal to the second conveyance distance L2, separates away from the sheet feed roller 40 after the original sheet G reaches the position Z3.

That is, the original sheet G of the second sheet type is conveyed by both of the first conveyance rollers 44 and the second conveyance rollers 46 after separating from the feed roller. Contrarily, the original sheet G of the first sheet type is conveyed only by the first conveyance rollers 44 after separating from the sheet feed roller 40.

Figure 11A:
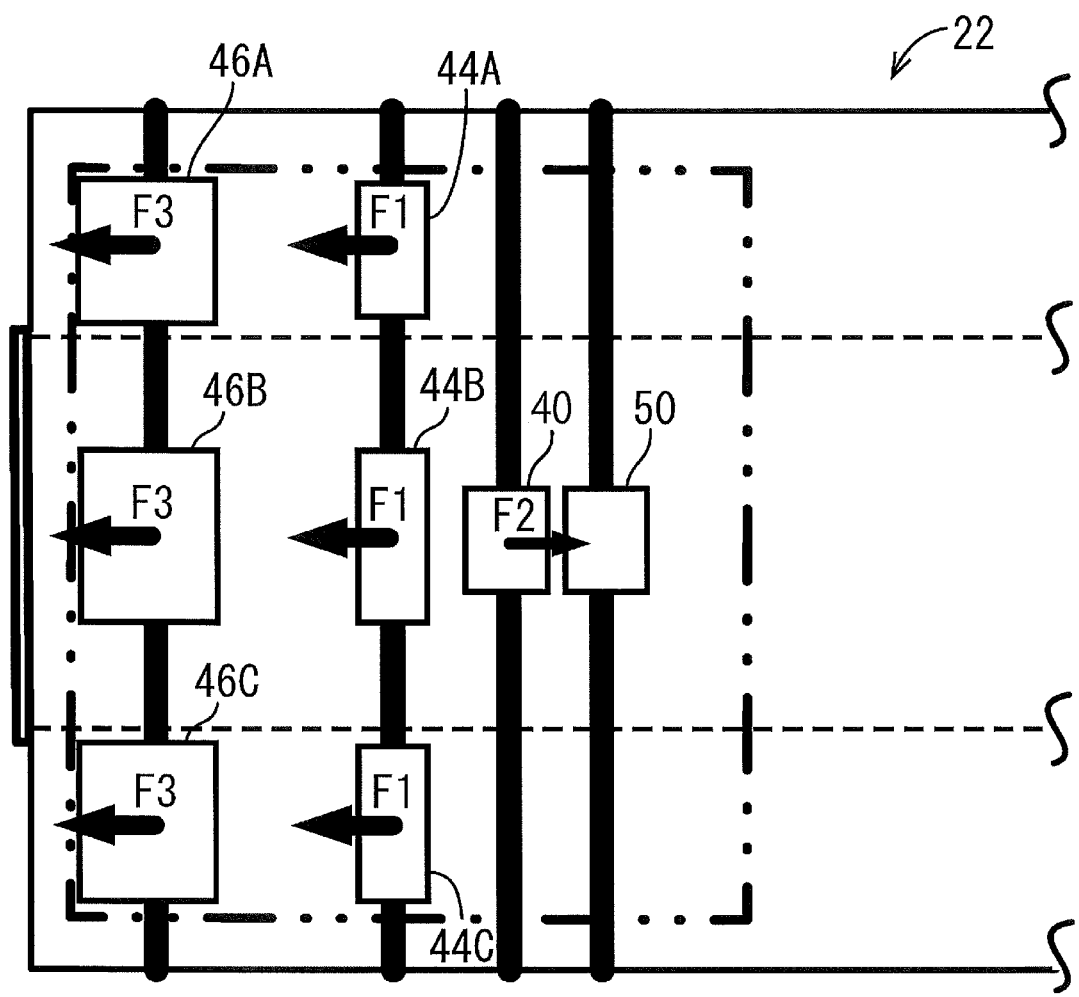
FIGS. 11A and 11B show various forces applied from conveyance unit to original sheets while the original sheets are being conveyed.
Figure 11B:
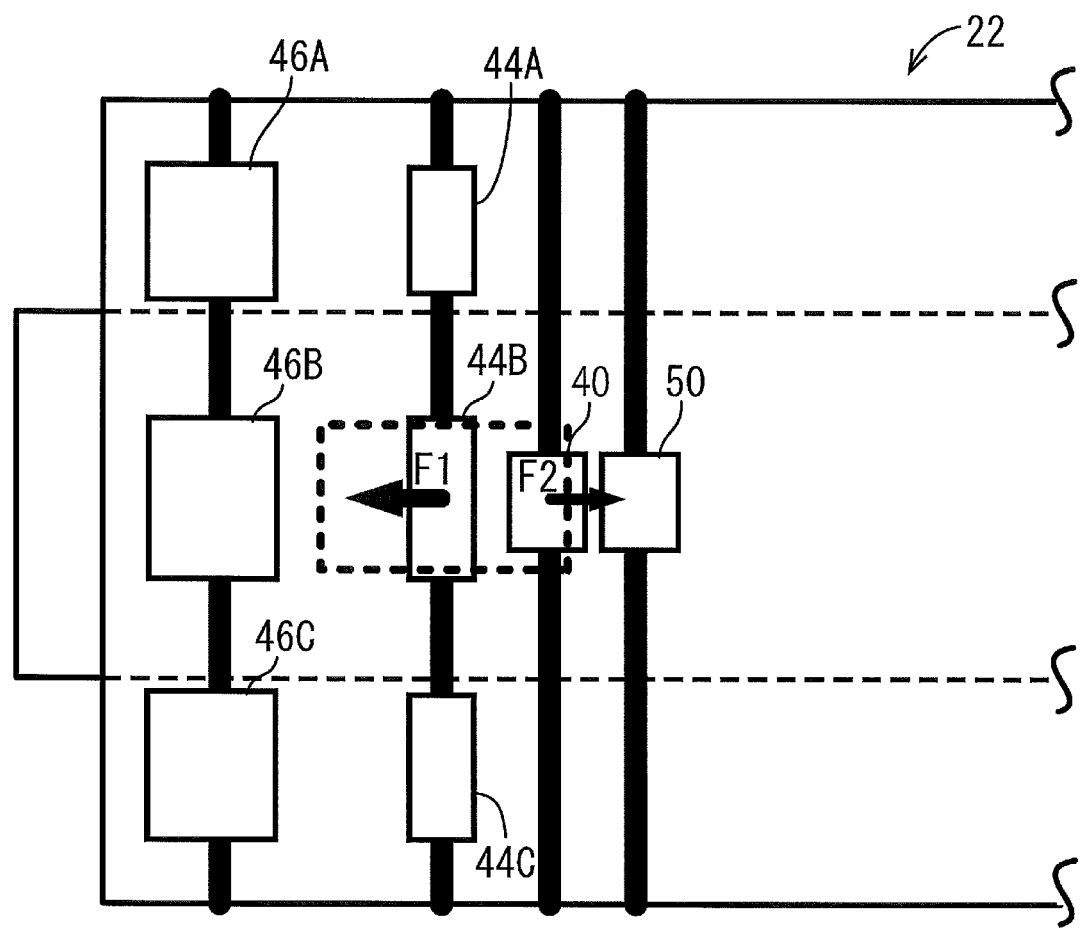

Therefore, as shown in FIG. 11A, while an original sheet G of the second sheet type such as a postcard or A4-size sheet is subjected to the restraining force F2, there is some period of time, during which the original sheet G is subjected to both of the driving forces F1 and F3. On the other hand, as shown in FIG. 11B, while an original sheet G of the first sheet type such as a business card is subjected to the restraining force F2, there is no period of time, during which the original sheet G is subjected to both of the driving forces F1 and F3. Accordingly, compared to the second sheet type, the original sheet of the first sheet type is more affected by the restraining force F2 while the original sheet is subjected to the restraining force F2.

Accordingly, the leading-edge arrival timings ST and the trailing-edge arrival timings KT for the original sheets of the first sheet type are delayed in comparison with those for the original sheets of the second sheet type. The sub-scanning magnifications HB for the original sheets of the first sheet type need to be set smaller than those for the original sheets of the second sheet type.

Thus, appropriate values for the parameters such as the leading-edge arrival timings ST, trailing-edge arrival timings KT, and sub-scanning magnifications HB vary depending on whether or not the sheet length of an original sheet G to be read is shorter than the second conveyance distance L2. So, according to the image reading apparatus 1 of the present embodiment, the conveyance reading process described below includes a process of setting parameters depending on the sheet length of an original sheet G to be read.

It is noted that as shown in FIG. 2, the original sheet G has to be conveyed by a distance X1 along the conveyance path 22 after the leading edge of the original sheet G has reached the detection position Y4 and until the leading edge of the original sheet G reaches the first reading position Y1. The first step number PA is defined as the number of steps (pulses) required for the leading edge of the original sheet G to reach the first reading position Y1 after reaching the detection position Y4.

The original sheet G has to be conveyed also by the distance X1 along the conveyance path 22 after the trailing edge of the original sheet G has reached the detection position Y4 and until the trailing edge of the original sheet G reaches the first reading position Y1. The second step number PB is defined as the number of steps (pulses) required for the trailing edge of the original sheet G to reach the first reading position Y1 after reaching the detection position Y4.

The original sheet G has to be conveyed by a distance X2 along the conveyance path 22 after the leading edge of the original sheet G has reached the detection position Y4 and until the leading edge of the original sheet G reaches the second reading position Y2. The third step number PC is defined as the number of steps (pulses) required for the leading edge of the original sheet G to reach the second reading position Y2 after reaching the detection position Y4.

The original sheet G has to be conveyed also by the distance X2 along the conveyance path 22 after the trailing edge of the original sheet G has reached the detection position Y4 and until the trailing edge of the original sheet G reaches the second reading position Y2. The fourth step number PD is defined as the number of steps (pulses) required for the trailing edge of the original sheet G to reach the second reading position Y2 after reaching the detection position Y4.

3. Conveyance Reading Process

Figure 4:
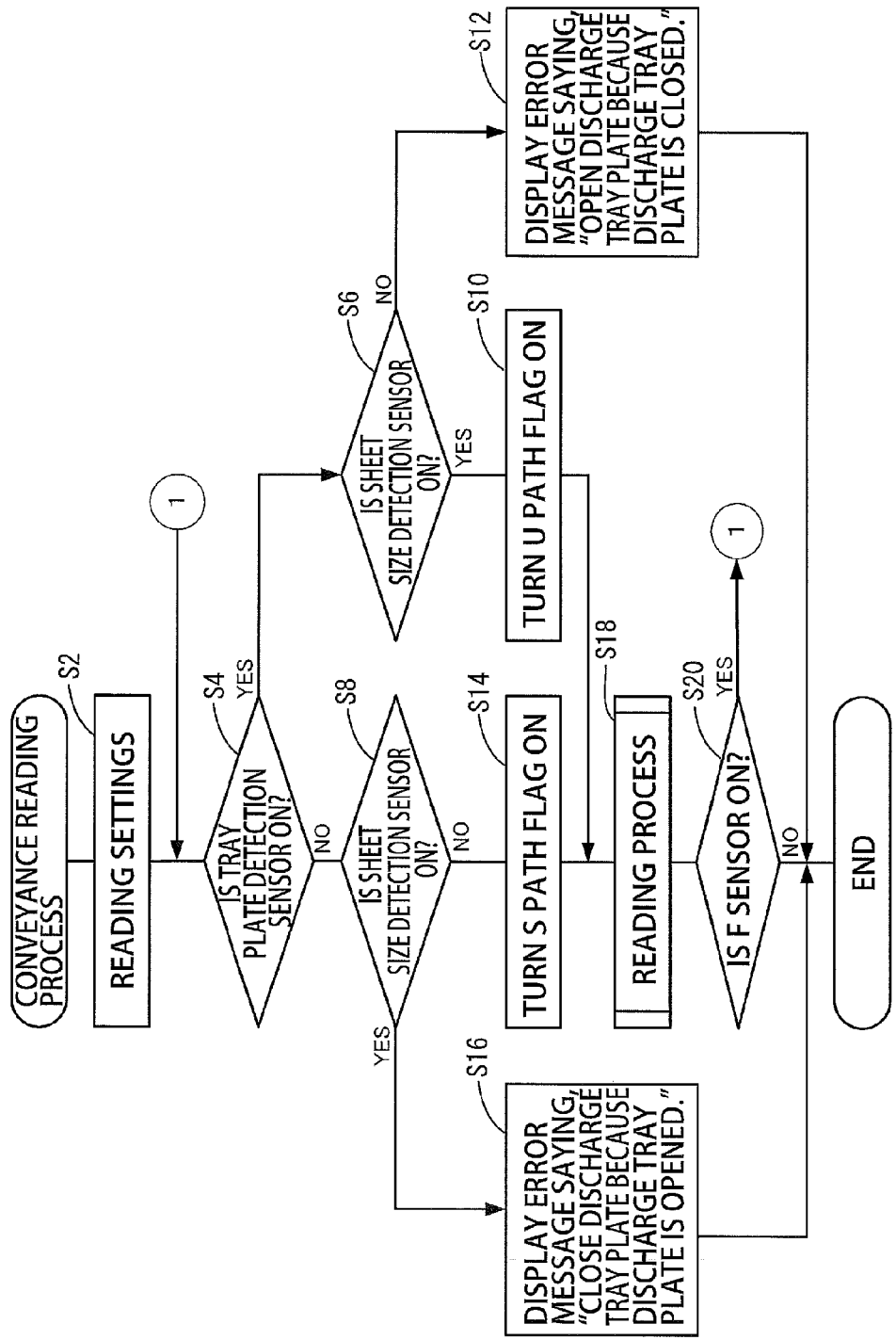
FIG. 4 is a flowchart of a conveyance reading process according to the first embodiment.

The following describes the conveyance reading process for an original sheet G with reference to FIGS. 4 to 8. According to the present embodiment, a front surface of an original sheet G is read by the first CIS 30. FIG. 4 is a flowchart showing the conveyance reading process that the CPU 20 performs in accordance with a prescribed program. The CPU 20 starts the process after the CPU 20 confirms by using the front sensor 13 that an original sheet G has been placed on the sheet feed tray 2 and a conveyance reading instruction for the original sheet G is inputted by a user through the operation unit 11.

After starting the conveyance reading process, the CPU 20 receives reading settings, such as a type of the original sheet G and a surface of the original sheet G to be read, which have been inputted by the user together with the conveyance reading instruction (S2). Then, the CPU 20 checks the state of the tray plate detection sensor 15 and sheet size detection sensor 16. More specifically, the CPU 20 first checks whether the tray plate detection sensor 15 is being ON. If the tray plate detection sensor 15 is being ON (S4: YES), i.e. if the discharge tray plate 54 is in the closed state, the CPU 20 detects that the original sheet G is to be conveyed along the U path 22B.

Then, the CPU 20 checks whether the sheet size detection sensor 16 is being ON (S6). If the sheet size detection sensor 16 is being ON (S6: YES), the state of the tray plate detection sensor 15 is consistent with the state of the sheet size detection sensor 16 because it is known that the original sheet G to be conveyed along the U path 22B is a large sheet. In this case, the CPU 20 turns ON a U path flag, indicating that the original sheet G is to be conveyed along the U path 22B (S10). Then, the CPU 20 performs a reading process described later (S18).

On the other hand, if the sheet size detection sensor 16 is being OFF (S6: NO), the CPU 20 detects that the original sheet G to be conveyed along the U path 22B is a small sheet. If a small sheet is conveyed along the U path 22B, the original sheet is apt to be jammed in a curved portion along the periphery of one of the second conveyance rollers 46 on the U path 22B. So, the CPU 20 displays, on the display unit 12, an error message saying, "Open the discharge tray plate because the discharge tray plate is closed," before starting to convey the original sheet G (S12). Then, the CPU 20 ends the conveyance reading process.

If the tray plate detection sensor 15 is OFF (S4: NO), i.e. if the discharge tray plate 54 is in the opened state, the CPU 20 detects that the original sheet G is to be conveyed along the S path 22A. Then, the CPU 20 checks whether the sheet size detection sensor 16 is being ON (S8). If the sheet size detection sensor 16 is being OFF (S8: NO), the state of the tray plate detection sensor 15 is consistent with the state of the sheet size detection sensor 16 because it is known that the original sheet G to be conveyed along the S path 22A is a small sheet. In this case, the CPU 20 turns ON an S path flag, indicating that the original sheet G is to be conveyed along the S path 22A (S14). Then, the CPU 20 performs the reading process (S18).

On the other hand, if the sheet size detection sensor 16 is ON (S8: YES), the CPU 20 detects that the original sheet G to be conveyed along the S path 22A is a large sheet. If a large sheet is conveyed along the S path 22A, the large sheet cannot be discharged onto the sheet discharge tray 4B, and becomes jammed. Therefore, the CPU 20 displays, on the display unit 12, an error message saying, "Close the discharge tray plate because the discharge tray plate is opened," before starting to convey the original sheet G (S16). Then, the CPU 20 ends the conveyance reading process.

Figure 5:
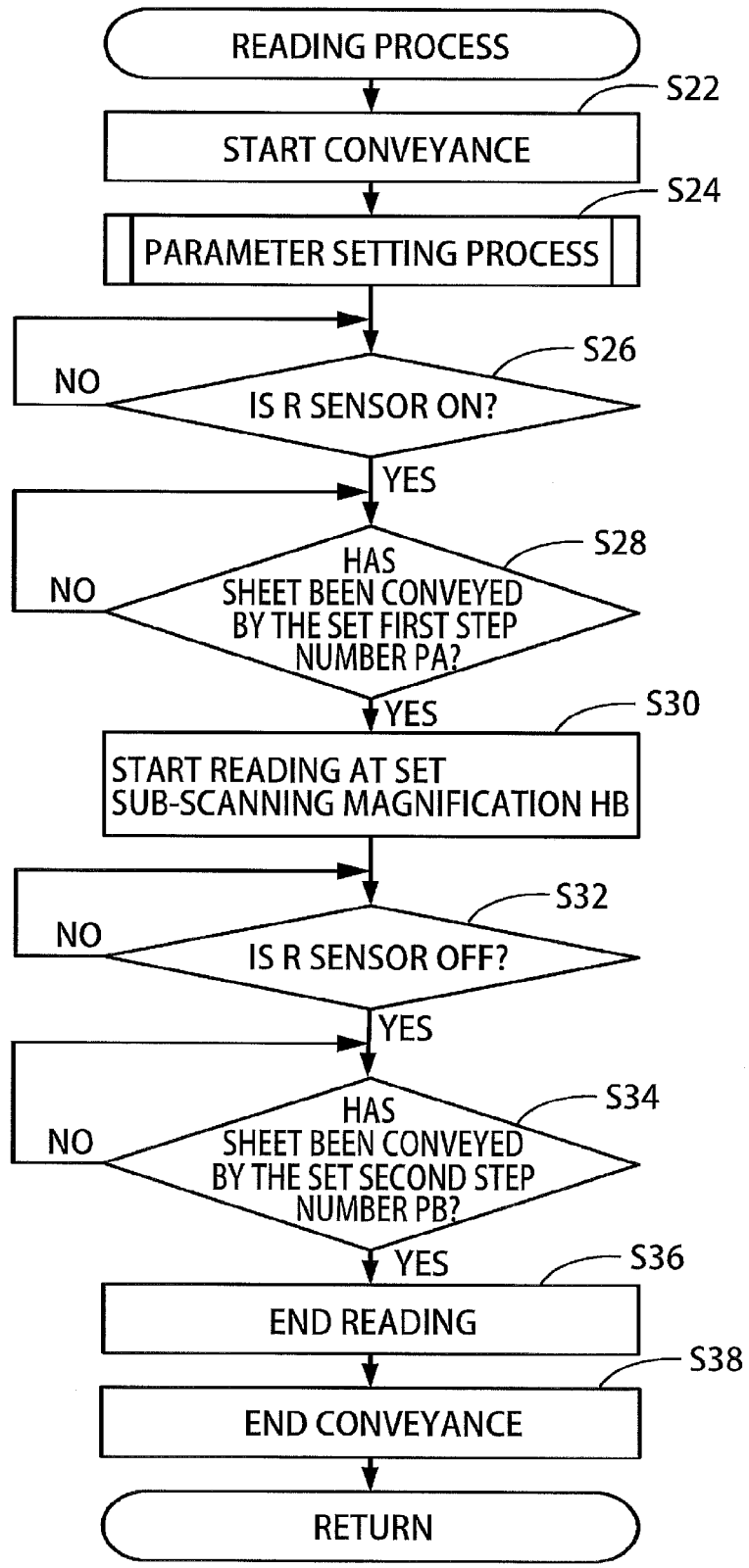
FIG. 5 is a flowchart of a reading process shown in FIG. 4 according to the first embodiment.

The following describes the reading process. FIG. 5 is a flowchart showing the reading process. In the reading process, the CPU 20 first instructs the conveyance unit 56 to convey an original sheet G (S22). Then, a parameter setting process is executed to set parameters such as the leading-edge arrival timing ST, trailing-edge arrival timing KT, and sub-scanning magnification HB for the first CIS 30 (S24).

Figure 6:
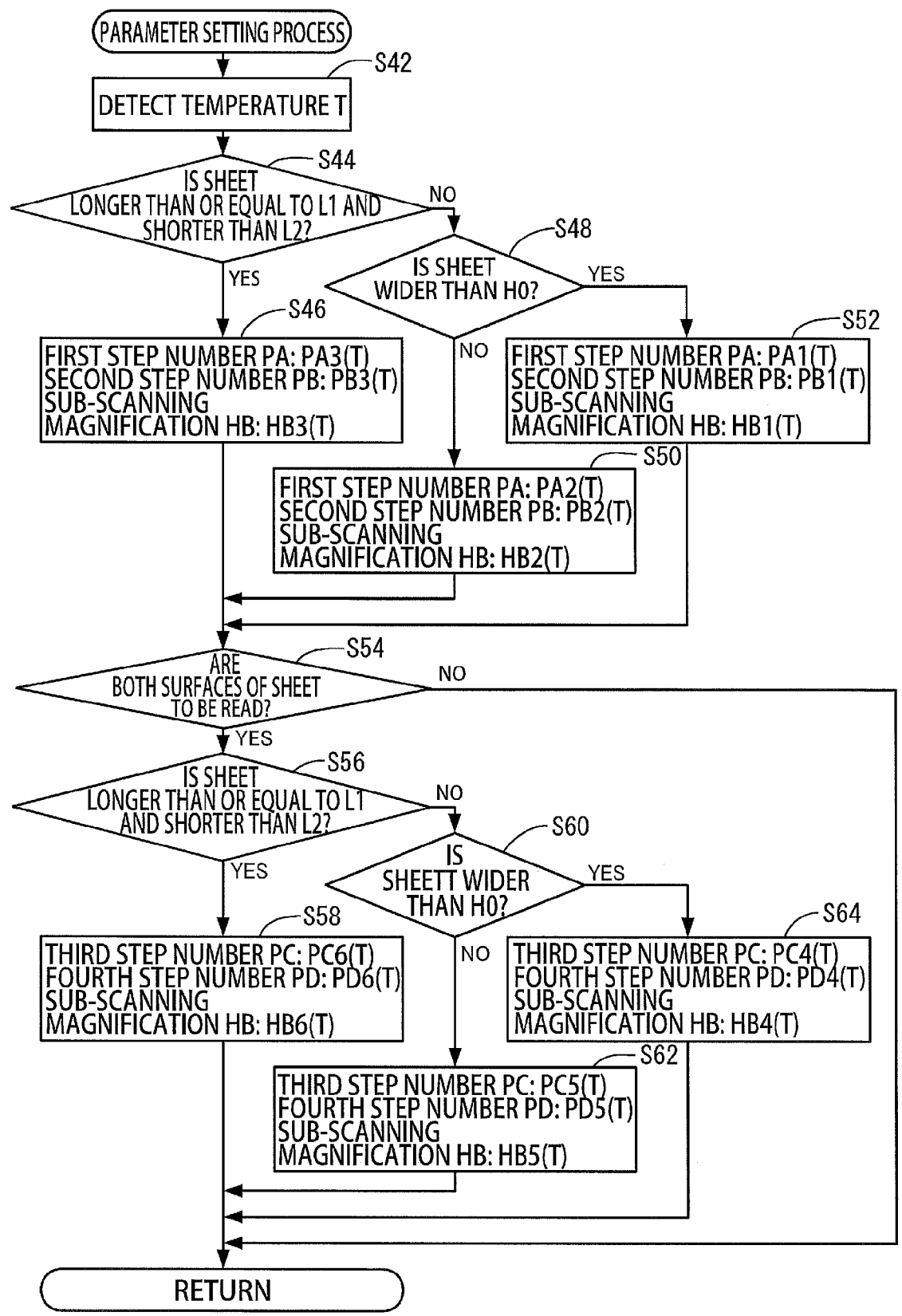
FIG. 6 is a flowchart of a parameter setting process shown in FIG. 5 according to the first embodiment.

FIG. 6 is a flowchart showing the parameter setting process. In the parameter setting process, the CPU 20 first uses the temperature sensor 17 to detect the temperature T inside the apparatus (S42). Then, the CPU 20 performs a process of setting parameters to be used for reading by the first CIS 30 (S44 to S52). More specifically, the CPU 20 sets: the parameters including the leading-edge arrival timing ST, trailing-edge arrival timing KT, and sub-scanning magnification HB for the first CIS 30; or parameters that are used to set the parameters ST, KT, and HB for the first CIS 30. In this example, the CPU 20 sets: the first step number PA that is a parameter used for setting the parameter ST for the first CIS 30; the second step number PB that is a parameter used for setting the parameter KT for the first CIS 30; and the parameter HB for the first CIS 30.

In setting the parameters for the first CIS 30, the CPU 20 first compares a sheet length of the sheet type that has been set in S2 with the first conveyance distance L1 and second conveyance distance L2 stored in the ROM 26 (S44). The CPU 20 regards the sheet length of the sheet type set in S2 as the sheet length of the original sheet G to be read. If the sheet length of the original sheet G is greater than or equal to the first conveyance distance L1, and is less than the second conveyance distance L2 (S44: YES), the CPU 20 determines that the original sheet G is of the first sheet type. In this case, based on the fact that the original sheet G is of the first sheet type, the CPU 20 sets in S46 the first step number PA into PA3(T) corresponding to the first sheet type, and sets the second step number PB into PB3(T) corresponding to the first sheet type. As a result, the leading-edge arrival timing ST for the first CIS 30 is set to such a timing, at which a length of time that is determined by multiplying a cycle of the pulse signal by the number PA3(T) will have passed since the leading edge of the original sheet G reaches the detection position Y4. The trailing-edge arrival timing KT for the first CIS 30 is set to such a timing, at which a length of time that is determined by multiplying the cycle of the pulse signal by the number PB3(T) will have passed since the trailing edge of the original sheet G reaches the detection position Y4. Furthermore, the CPU 20 sets in S46 the sub-scanning magnification HB for the first CIS 30 into HB3(T) corresponding to the first sheet type, based on the number of steps (pulses) required for the original sheet G of the first sheet type to pass through the first reading position Y1 along the conveyance path 22.

Parameters such as the first step number PA and second step number PB for the first CIS 30, the third step number PC and fourth step number PD for the second CIS 32, and sub-scanning magnification HBs for the first and second CISs 30 and 32 are affected by the temperature T inside the apparatus. This is because in the image reading apparatus 1, as the temperature T inside the apparatus increases, each roller swells, resulting in an increase in the conveyance speed of the original sheet G. As the temperature T inside the apparatus decreases, each roller becomes smaller in size, resulting in a decrease in the conveyance speed of the original sheet G. That is, in the image reading apparatus 1, the conveyance speed of the original sheet G is affected by the temperature T inside the apparatus.

Therefore, parameters such as the first step number PA and second step number PB for the first CIS 30, the third step number PC and fourth step number PD for the second CIS 32, and sub-scanning magnification HB for the first and second CISs 30 and 32 are set for each temperature range and are prestored in the ROM 26. FIG. 8 shows the sub-scanning magnification HB for each of the CISs 30 and 32 and for each temperature range, as a correction value that is determined by correcting a predetermined standard sub-scanning magnification that is set in advance. FIG. 8 also shows each of the first step number PA and the second step number PB for the first CIS 30 and for each temperature range as a correction value that is obtained by correcting a predetermined standard step number for the CIS 30 and by converting the corrected result into a distance. In this example, the first step number PA and the second step number PB are set to be equal with each other. FIG. 8 also shows each of the third step number PC and the fourth step number PD for the CIS 32 and for each temperature range as a correction value that is obtained by correcting a predetermined standard step number for the CIS 32 and by converting the corrected result into a distance. In this example, the third step number PC and the fourth step number PD are set to be equal with each other.

As shown in FIG. 8, the first step number PA and the second step number PB are set so that the first step number PA and the second step number PB become smaller as the temperature range becomes higher. The third step number PC and the fourth step number PD are set so that the third step number PC and the fourth step number PD become smaller as the temperature range becomes higher. The sub-scanning magnification HB is set so that the sub-scanning magnification HB becomes greater as the temperature range becomes higher.

So, in S46, the CPU 20 refers to the table shown in FIG. 8, and sets the first step number PA, the second step number PB, and the sub-scanning magnification HB for the first CIS 30 based on the sheet type of the original sheet G to be read (first sheet type) and the temperature T inside the apparatus that is detected in S42.

On the other hand, if the sheet length of the original sheet G is greater than or equal to both of the first conveyance length L1 and the second conveyance length L2 (S44: NO), it is known that the original sheet G is of the second sheet type. So, the CPU 20 further judges whether the sheet type set in S2 belongs to a small or large sheet.

More specifically, the CPU 20 compares a sheet width of the sheet type set in S2 with the width H0 of the center region MH that is stored in the ROM 26 (S48). The CPU 20 regards the sheet width of the sheet type set in S2 as the sheet width of the original sheet G to be read. If the sheet width of the original sheet G to be read is less than or equal to the width H0 of the center region MH (S48: NO), the CPU 20 determines that the original sheet G is of a third sheet type that belongs to a small sheet such as a postcard. In this case, based on the fact that the original sheet G is of the third sheet type and based on the temperature T inside the apparatus detected in S42, the CPU 20 sets the first step number PA into PA2(T), the second step number PB into PB2(T), and the sub-scanning magnification HB into HB2(T) by referring to the table in FIG. 8 (S50).

On the other hand, if the sheet width of the original sheet G is greater than the width H0 of the center region MH (S48: YES), the CPU 20 determines that the original sheet G is of a fourth sheet type that belongs to a large sheet such as an A4-size sheet. In this case, based on the fact that the original sheet G is of the fourth sheet type and based on the temperature T inside the apparatus detected in S42, the CPU 20 sets the first step number PA into PA1(T), the second step number PB into PB1(T), and the sub-scanning magnification HB into HB1(T) by referring to the table in FIG. 8 (S52).

As shown in FIG. 8, in the same temperature range, the first step numbers PA1(T), PA2(T), and PA3(T) are set so that the numbers PA1(T), PA2(T), and PA3(T) are arranged in an ascending order, with the number PA1(T) being the smallest, and the number PA3(T) being the largest among the three numbers PA1(T), PA2(T), and PA3(T). Similarly, the second step numbers PB1(T), PB2(T), and PB3(T) are set so that the numbers PB1(T), PB2(T), and PB3(T) are arranged in an ascending order, with the number PB1(T) being the smallest, and the number PB3(T) being the largest among the three numbers PB1(T), PB2(T), and PB3(T). The sub-scanning magnifications HB1(T), HB2(T), and HB3(T) are set so that the values HB1(T), HB2(T), and HB3(T) are arranged in a descending order, with the value HB1(T) being the largest, and the value HB3(T) being the smallest among the three values HB1(T), HB2(T), and HB3(T).

Then, based on the surface to be read that is set in S2, the CPU 20 checks whether or not both of front and back surfaces of the original sheet G are to be read (S54). According to the present embodiment, only the front surface of the original sheet G is to be read. Therefore, the CPU 20 does not perform a process (S56 to S64) of setting parameters to be used for reading by the second CIS 32 (S54: NO), and ends the parameter setting process.

The CPU 20 then returns to the reading process. In the reading process, the CPU 20 uses the rear sensor 14 to detect the position of the original sheet G being conveyed (S26: NO). When the rear sensor 14 is turned ON indicating that the leading edge of the original sheet G has reached the detection position Y4 (S26: YES), the CPU 20 further conveys the original sheet G by the first step number PA that has been set in S24 (S28: NO). When the original sheet G has been conveyed by the first step number PA (S28: YES), the CPU 20 instructs the first CIS 30 to read the front surface of the original sheet G (S30). It is noted that the first CIS 30 scans the original sheet G to read an image from the original sheet G and generates read data indicative of the read image, and the CPU 20 enlarges or reduces the read data at the sub-scanning magnification HB set in S24. Or, the CPU 20 controls the first CIS 30 so that the first CIS 30 scans the original sheet G to read an image from the original sheet G, while enlarging or reducing the image at the sub-scanning magnification HB set in S24.

The CPU 20 continues reading the original sheet G until the rear sensor 14 is turned OFF (S32: NO). When the rear sensor 14 is turned OFF, indicating that the trailing edge of the original sheet G has reached the detection position Y4 (S32: YES), the CPU 20 further conveys the original sheet G by the second step number PB that has been set in S24 (S34: NO). When the original sheet G has been conveyed by the second step number PB (S34: YES), the CPU 20 stops reading the surface of the original sheet G (S36). The CPU 20 discharges the original sheet G onto a sheet discharge tray 4A or 4B corresponding to the sheet size thereof, and stops conveying the original sheet G (S38), and ends the reading process.

After returning to the conveyance reading process, the CPU 20 uses the front sensor 13 to detect whether or not there is any original sheet G left on the sheet feed tray 2 to read (S20). If there is some original sheet G left to read (S20: YES), the CPU 20 repeats the process of S4 and subsequent processes. If there is no original sheet G left to read (S20: NO), the CPU 20 ends the conveyance reading process.

4. Operations of the Present Embodiment (1) The image reading apparatus 1 of the present embodiment makes a determination as to whether an original sheet G is of a first or second sheet type. Based on the determination result, the image reading apparatus 1 sets parameters such as the first step number PA, second step number PB, and sub-scanning magnification HB for the first CIS 30, and reads the original sheet G by using the set parameters. The sheet length of the first sheet-type original sheet G is shorter than the second conveyance distance L2. So, while the original sheet G of the first sheet type is being sent out by the sheet supply roller 40, the original sheet G is conveyed only by the first conveyance rollers 44. Therefore, the conveyance speed is likely to become slower compared with the second sheet-type original sheet G. This is because the sheet length of the second sheet-type original sheet G is longer than or equal to the second conveyance distance L2, and therefore while the original sheet G of the second sheet type is being sent out by the sheet supply roller 40, there is some period of time, during which the original sheet G of the second sheet type is conveyed by both of the first and second conveyance rollers 44 and 46.

The image reading apparatus switches the values of the parameters depending on whether the original sheet G is of the first or second sheet type. More specifically, the first step number PA and second step number PB for the first sheet-type original sheet are set to be larger than those for the second sheet-type original sheet; the sub-scanning magnification HB for the first sheet-type original sheet is set to be smaller than that for the second sheet-type original sheet. Accordingly, even if the conveyance speed becomes slower due to the sheet length of the original sheet G, by reading an image from the original sheet G by using the thus set parameters, it is possible: to correct expansion or contraction generated in image data that has been outputted from the first CIS 30; or to prevent the first CIS 30 from generating such image data that includes expansion or contraction in the sub-scanning direction D2. In this manner, it is possible to restrain expansion or contraction of resultant image data obtained by the image reading apparatus 1.

(2) After determining that the original sheet G is of the second sheet type, the image reading apparatus 1 of the present embodiment further determines whether the original sheet G is of the third or fourth sheet type. Based on the determination result, the image reading apparatus 1 sets parameters such as the first step number PA, second step number PB, and sub-scanning magnification HB for the first CIs 30, and reads the original sheet G by using the set parameters. The sheet width of the third sheet-type original sheet G is shorter than the width H0 of the center region MH, and therefore the original sheet G of the third sheet type is conveyed only by one roller portion among the three roller portions constituting each of the first conveyance rollers 44. Therefore, the conveyance speed is likely to become slower compared with the fourth sheet-type original sheet G. This is because the sheet width of the fourth sheet-type original sheet G is longer than the width H0 of the center region MH, and therefore the original sheet G of the fourth sheet type is conveyed by the three roller portions constituting each of the first conveyance rollers 44.

The image reading apparatus switches the values of the parameters depending on whether the original sheet G is of the third or fourth sheet type. More specifically, the first step number PA and second step number PB for the third sheet-type original sheet are set to be larger than those for the fourth sheet-type original sheet; the third step number PC and fourth step number PD for the third sheet-type original sheet are set to be larger than those for the fourth sheet-type original sheet; and the sub-scanning magnification HB for the third sheet-type original sheet is set to be smaller than that for the fourth sheet-type original sheet. Accordingly, even if the conveyance speed becomes slower due to the sheet width of the original sheet G, by reading an image from the original sheet G by using the thus set parameters, it is possible: to correct expansion or contraction generated in image data that has been outputted from the first CIS 30; or to prevent the first CIS 30 from generating such image data that includes expansion or contraction in the sub-scanning direction D2. In this manner, it is possible to restrain expansion or contraction of resultant image data obtained by the image reading apparatus 1.

(3) The image reading apparatus 1 of the present embodiment detects the temperature T inside the apparatus when reading the original sheet G. Based on the detected temperature T, the image reading apparatus 1 sets parameters such as the first step number PA, second step number PB, and sub-scanning magnification HB for the first CIS 30, and reads the original sheet G by using the set parameters. Accordingly, even if the conveyance rollers 44 and 46 swell or contract due to changes in the temperature T inside the apparatus, and therefore the conveyance speed changes, by reading an image from the original sheet G by using the thus set parameters, it is possible: to correct expansion or contraction generated in image data that has been outputted from the first CIS 30; or to prevent the first CIS 30 from generating such image data that includes expansion or contraction in the sub-scanning direction D2. In this manner, it is possible to restrain expansion or contraction of resultant image data obtained by the image reading apparatus 1.

(4) The image reading apparatus 1 of the present embodiment detects the sheet size of an original sheet G to be read based on the reading settings that are detected in S2 prior to the reading process of S18. Therefore, in the reading process, based on the detected sheet size, the image reading apparatus 1 can determine whether the original sheet G is of the first or second sheet type, or of the third or fourth sheet type.

Second Embodiment

A second embodiment will be described with reference to FIGS. 4, 6, and 9. The present embodiment is different from the first embodiment in that, in the conveyance reading process, both surfaces of an original sheet G are read by the first CIS 30 and the second CIS 32. The same contents as those of the first embodiment will not be described below.

1. Conveyance Reading Process

As shown in FIG. 4, after starting the conveyance reading process, the CPU 20 detects the reading settings which are received together with the conveyance reading instruction (S2). According to the present embodiment, the reading settings are such that both of the front and back surfaces of an original sheet G are to be read. The CPU 20 executes the process of S4 and subsequent processes, and performs the reading process if the judgment result in S6 is affirmative or the judgment result in S8 is negative.

Figure 9:
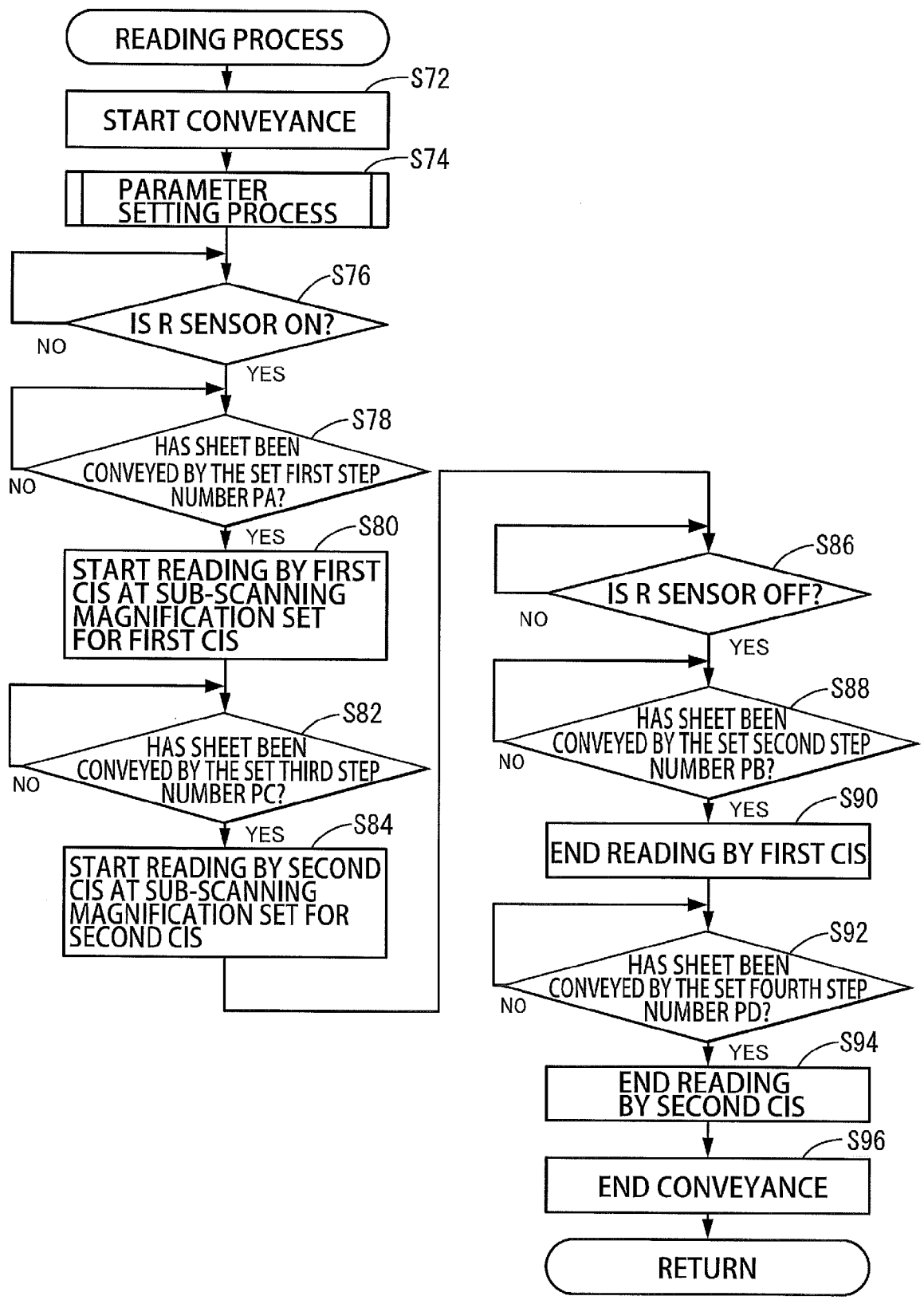
FIG. 9 is a flowchart of the reading process shown in FIG. 4 according to a second embodiment.

FIG. 9 is a flowchart showing the reading process of the present embodiment. In the reading process, the CPU 20 first instructs the conveyance unit 56 to convey the original sheet G (S72), and performs a parameter setting process to set parameters, such as the leading-edge arrival timing ST, trailing-edge arrival timing KT, and sub-scanning magnification HB, for each of the first CIS 30 and second CIS 32 (S74).

As shown in FIG. 6, in the parameter setting process, the CPU 20 first detects the temperature T inside the apparatus by using the temperature sensor 17 (S42). Then, the CPU 20 performs the process in S44 to S52 to set parameters for reading by the first CIS 30. Incidentally, the process of setting the parameters for the first CIS 30 is the same as that of the first embodiment, and therefore will not be described again.

Then, based on the surface to be read that is set in S2, the CPU 20 checks whether or not both of the front and back surfaces of the original sheet G are to be read (S54). According to the present embodiment, both of the front and back surfaces of the original sheet G are to be read. Therefore, the CPU 20 performs the process (S56 to S64) of setting parameters to be used for reading by the second CIS 32 (S54: YES). More specifically, the CPU 20 sets: the parameters including the leading-edge arrival timing ST, trailing-edge arrival timing KT, and sub-scanning magnification HB for the second CIS 32; or parameters that are used to set the parameters ST, KT, and HB for the second CIS 32. In this example, the CPU 20 sets: the third step number PC that is a parameter used for setting the parameter ST for the second CIS 32; the fourth step number PD that is a parameter used for setting the parameter KT for the second CIS 32; and the parameter HB for the second CIS 32.

In setting the parameters for the second CIS 32, the CPU 20 first compares a sheet length of the sheet type that has been set in S2 with the first conveyance distance L1 and second conveyance distance L2 stored in the ROM 26 (S56). If the sheet length of the original sheet G is greater than or equal to the first conveyance distance L1, and is less than the second conveyance distance L2 (S56: YES), the CPU 20 determines that the original sheet G is of the first sheet type. In this case, based on the fact that the original sheet G is of the first sheet type and based on the temperature inside the apparatus detected in S42, the CPU 20 sets in S58 the third step number PC into PC6(T) corresponding to the first sheet type, and sets the fourth step number PD into PD6(T) corresponding to the first sheet type by referring to the table in FIG. 8. As a result, the leading-edge arrival timing ST for the second CIS 32 is set to such a timing, at which a length of time that is determined by multiplying the cycle of the pulse signal by the number PC6(T) will have passed since the leading edge of the original sheet G reaches the detection position Y4. The trailing-edge arrival timing KT for the second CIS 32 is set to such a timing, at which a length of time that is determined by multiplying the cycle of the pulse signal by the number PD6(T) will have passed since the trailing edge of the original sheet G reaches the detection position Y4. In S58, referring to the table in FIG. 8, the CPU 20 further sets the sub-scanning magnification HB for the second CIS 32 into HB6(T) corresponding to the first sheet type, based on the number of steps (pulses) required for the original sheet G of the first sheet type to pass through the second reading position Y2 along the conveyance path 22.

On the other hand, if the sheet length of the original sheet G is greater than or equal to both of the first conveyance length L1 and the second conveyance length L2 (S56: NO), it is known that the original sheet G is of the second sheet type. So, the CPU 20 further compares a sheet width of the sheet type set in S2 with the width H0 of the center region MH that is stored in the ROM 26 (S60). If the sheet width of the original sheet G to be read is less than or equal to the width H0 of the center region MH (S60: NO), the CPU 20 determines that the original sheet G is of a third sheet type that belongs to a small sheet such as a postcard. In this case, based on the fact that the original sheet G is of the third sheet type and based on the temperature T inside the apparatus detected in S42, the CPU 20 sets the third step number PC into PC5(T), the fourth step number PD into PD5(T), and the sub-scanning magnification HB into HB5(T) by referring to the table in FIG. 8 (S62).

On the other hand, if the sheet width of the original sheet G is greater than the width H0 of the center region MH (S60: YES), the CPU 20 determines that the original sheet G is of a fourth sheet type that belongs to a large sheet such as an A4-size sheet. In this case, based on the fact that the original sheet G is of the fourth sheet type and based on the temperature T inside the apparatus detected in S42, the CPU 20 sets the third step number PC into PC4(T), the fourth step number PD into PD4(T), and the sub-scanning magnification HB into HB4(T) by referring to the table in FIG. 8 (S64). Then, the CPU 20 ends the parameter setting process.

In this example, the third step number PC and the fourth step number PD are set to be equal with each other. In addition, as shown in FIG. 8, in the same temperature range, the third step numbers PC4(T), PC5(T), and PC6(T) are set so that the numbers PC4(T), PC5(T), and PC6(T) are arranged in an ascending order, with the number PC4(T) being the smallest, and the number PC6(T) being the largest among the three numbers PC4(T), PC5(T), and PC6(T). Similarly, the fourth step numbers PD4(T), PD5(T), and PD6(T) are set so that the numbers PD4(T), PD5(T), and PD6(T) are arranged in an ascending order, with the number PD4(T) being the smallest, and the number PD6(T) being the largest among the three numbers PD4(T), PD5(T), and PD6(T). The sub-scanning magnifications HB4(T), HB5(T), and HB6(T) are set so that the values HB4(T), HB5(T), and HB6(T) are arranged in a descending order, with the value HB4(T) being the largest, and the value HB6(T) being the smallest among the three values HB4(T), HB5(T), and HB6(T).

The CPU 20 then returns to the reading process. In the reading process, the CPU 20 uses the rear sensor 14 to detect the position of the original sheet G being conveyed (S76: NO). When the rear sensor 14 is turned ON indicating that the leading edge of the original sheet G has reached the detection position Y4 (S76: YES), the CPU 20 further conveys the original sheet G by the first step number PA that has been set in the parameter setting process of S74 (S78: NO). When the original sheet G has been conveyed by the first step number PA (S78: YES), the CPU 20 instructs the first CIS 30 to read the front surface of the original sheet G (S80). The CPU 20 controls the first CIS 30 to read the surface of the original sheet G, while executing an enlargement or reduction process by using the sub-scanning magnification HB that has been set in the parameter setting process of S74. Or, the CPU 20 executes, onto the read data that has been acquired by the first CIS 30, an enlargement or reduction process by using the sub-scanning magnification HB that has been set in the parameter setting process of S74.

The CPU 20 further continues conveying the original sheet G so that the original sheet G will have been conveyed by the third step number PC since the rear sensor 14 turned ON, the third step number being set in the parameter setting process of S74 (S82: NO). When the original sheet G has been conveyed by the third step number PC since the rear sensor 14 turned ON (S82: YES), the CPU 20 instructs the second CIS 32 to read the back surface of the original sheet G (S84). It is noted that the second CIS 32 scans the original sheet G to read an image from the original sheet G and generates read data indicative of the read image, and the CPU 20 enlarges or reduces the read data at the sub-scanning magnification HB set in S74. Or, the CPU 20 controls the second CIS 32 so that the second CIS 32 scans the original sheet G to read an image from the original sheet G, while enlarging or reducing the image at the sub-scanning magnification HB set in S74.

The CPU 20 continues reading the original sheet G until the rear sensor 14 is turned OFF (S86: NO). When the rear sensor 14 is turned OFF, indicating that the trailing edge of the original sheet G has reached the detection position Y4 (S86: YES), the CPU 20 further conveys the original sheet G by the second step number PB that has been set in the parameter setting process of S74 (S88: NO). When the original sheet G has been conveyed by the second step number PB (S88: YES), the CPU 20 stops reading by the first CIS 30 of the front surface of the original sheet G (S90).

The CPU 20 further continues conveying the original sheet G so that the original sheet G will have been conveyed by the fourth step number PD since the rear sensor 14 turned OFF, the fourth step number being set in the parameter setting process of S74 (S92: NO). When the original sheet G has been conveyed by the fourth step number PD since the rear sensor 14 turned OFF (S92: YES), the CPU 20 stops reading by the second CIS 32 of the back surface of the original sheet G (S94). The CPU 20 discharges the original sheet G onto a sheet discharge tray 4A or 4B corresponding to the sheet size thereof, and stops conveying the original sheet G (S96), and ends the reading process.

After returning to the conveyance reading process, the CPU 20 uses the front sensor 13 to detect whether or not there is any original sheet G left on the sheet feed tray 2 to read (S20). If there is some original sheet G left to read (S20: YES), the CPU 20 repeats the process of S4 and subsequent processes. If there is no original sheet G left to read (S20: NO), the CPU 20 ends the conveyance reading process.

2. Operations of the Present Embodiment

When reading both surfaces of the original sheet G by using the first CIS 30 and the second CIS 32, the image reading apparatus 1 of the present embodiment can restrain expansion or contraction of image data that will possibly occur at each CIS due to the sheet length or sheet width. In particular, even though the first reading position Y1 where the first CIS 30 is disposed along the conveyance path 22 is different from the second reading position Y2 where the second CIS 32 is disposed, the difference is taken into account in restraining expansion or contraction of image data.

Other Embodiments

While the invention has been described in detail with reference to the embodiments thereof, it would be apparent to those skilled in the art that various changes and modifications may be made therein without departing from the spirit of the invention.

(1) For example, according to the above-described embodiments, the image reading apparatus 1 has a scanner function. However, the present invention is not limited to this example. For example, the present invention may be applied to a multifunction peripheral having a printer function, copy function, facsimile function, and other functions.

(2) According to the above embodiments, the image reading apparatus 1 has a single CPU 20 that executes various processes in the conveyance reading process. However, the present invention is not limited to this example. For example, a plurality of CPUs may be employed each for executing each part in the conveyance reading process. Or, one or more hardware circuit such as ASIC (Application Specific Integrated Circuit) may be employed for executing each part in the conveyance reading process. Or, one or more CPU and one or more ASIC may be employed to execute each part in the conveyance reading process.

(3) The program executed by the CPU 20 is not necessarily stored in the ROM 26. The program may be stored in the CPU 20 or any other storage device.

(4) According to the above embodiments, based on the positional relationship between the conveyance rollers 44 and 46 of the image reading apparatus 1, a business card serves as an example of the first sheet-type original sheet G, a postcard serves as an example of the third sheet-type original sheet G, and an A4-size sheet serves as an example of the fourth sheet-type original sheet G. However, the present invention is not limited to this example. For example, if the positional relationship between the conveyance rollers 44 and 46 is changed, a postcard may belong to the first sheet-type original sheets G, and an A4-size sheet may belong to the third sheet-type original sheets G.

(5) According to the above embodiments, in determining whether the original sheet G is of the third or fourth sheet type, the size of the original sheet is detected based on the reading settings. However, the present invention is not limited to this example. For example, based on the state of the sheet size detection sensor 16, a determination may be made as to whether the original sheet G is a small or large sheet. If the state of the sheet size detection sensor 16 is consistent with the state of the tray plate detection sensor 15, a determination may be made as to whether the original sheet G is a small or large sheet based on the state of the tray plate detection sensor 15, instead of the state of the sheet size detection sensor 16.

(6) According to the above embodiments, first, a determination is made as to whether the original sheet G is of the first or second sheet type. If it is determined that the original sheet G is of the second sheet type, then another determination is made as to whether the original sheet G is of the third or fourth sheet type. However, only a determination as to whether the original sheet G is of the first sheet type or of the second sheet type may be executed. Or, only a determination as to whether the original sheet G is of the third sheet type or the fourth sheet type may be executed.

(7) According to the above embodiments, in the process (S56 to S64) of setting parameters for the second CIS 32, judging processes the same as those in S44 and S48 in the process (S44-S52) of setting parameters for the first CIS 30 are executed in S56 and S60. However, the present invention is not limited to this example. For example, the results of determination in S44 and S48 may be temporarily stored, and used in S58 and S60.

(8) According to the above embodiments, the width H0 of the center region MH is used as a single threshold value in determining whether the original sheet G is of the third or fourth sheet type. However, a plurality of threshold values may be used for the determination. A plurality of threshold values may be used in determining, among three or more sheet types, which type the original sheet is.

What is claimed is:
1. An image reading apparatus, comprising:
   a sheet feed tray;
   a supply roller configured to rotate while being in contact with an original sheet placed on the sheet feed tray and to send out the original sheet one sheet by one sheet to a conveyance path;
   a conveyance unit including a first conveyance roller and a second conveyance roller and configured to convey, along the conveyance path, the original sheet that has been sent out by the supply roller to the conveyance path, the conveyance unit conveying the original sheet by using the first conveyance roller and the second conveyance roller in succession in this order;
   a discharged-sheet receiving unit, into which the original sheet that has been conveyed by the conveyance unit is discharged;
   an image reading unit disposed at a reading position along the conveyance path between the first conveyance roller and the second conveyance roller and configured to read an image, in a main scanning direction, from the original sheet conveyed by the conveyance unit at the reading position;

a sensor disposed at a detection position that is defined along the conveyance path upstream of the reading position, the sensor being configured to detect the original sheet; and a control device configured to:

judge whether the original sheet is either one of a first sheet type, whose sheet length in a conveying direction along the conveyance path is longer than or equal to a first conveyance distance and shorter than a second conveyance distance, and a second sheet type, whose sheet length in the conveying direction along the conveyance path is longer than or equal to the second conveyance distance, the first conveyance distance being a distance between the first conveyance roller and the second conveyance roller along the conveyance path, the second conveyance distance being a distance between the supply roller and the second conveyance roller along the conveyance path;

set at least one of a first parameter and a second parameter dependently on the judged result, the first parameter indicating a first length of time, the first length of time being a conveyance time between when a leading edge of the original sheet in the conveying direction reaches the detection position and when the leading edge of the original sheet in the conveying direction reaches the first reading position, the second parameter indicating a second length of time, the second length of time being a conveyance time between when a trailing edge of the original sheet in the conveying direction reaches the detection position and when the trailing edge of the original sheet in the conveying direction reaches the reading position; and control the image reading unit to start reading an image from the original sheet when the first length of time has passed after the sensor detected the leading edge of the original sheet and control the image reading unit to stop reading the image from the original sheet when the second length of time has passed after the sensor detected the trailing edge of the original sheet.

2. The image reading apparatus as claimed in claim 1, wherein the control device is configured to further set a sub-scanning magnification dependently on the judged result, the sub-scanning magnification indicating an enlargement or reduction ratio in a sub-scanning direction orthogonal to the main scanning direction that is to be applied onto the image read from the original sheet by the image reading unit; and modify, by using the set sub-scanning magnification, image data indicative of the image that is read from the original sheet by the image reading unit.

3. The image reading apparatus as claimed in claim 2, wherein the supply roller is disposed in part of a conveyance region of the conveyance path in the main scanning direction, each of the first and second conveyance rollers includes a plurality of roller portions arranged in the main scanning direction, if the original sheet is determined to be of the second sheet type, the control device is configured to further judge whether the original sheet is of a third sheet type or a fourth sheet type, the number of a roller portion that constitutes the first conveyance roller and that conveys an original sheet of the third sheet type being smaller than or equal to a reference number, the number of a roller portion that constitutes the second conveyance roller and that conveys an original sheet of the third sheet type being smaller than or equal to a reference number, the number of a roller portion that constitutes at least one of the first and second conveyance rollers and that conveys an original sheet of the fourth sheet type being greater than the reference number, the control device is configured to set the sub-scanning magnification and at least one of the first parameter and the second parameter dependently on whether the original sheet is of the third sheet type or the fourth sheet type.

4. The image reading apparatus as claimed in claim 3, wherein the discharged-sheet receiving unit includes a first sheet discharge tray and a second sheet discharge tray, the conveying path diverges into a first conveyance path and a second conveyance path at a position downstream of the second conveyance roller in the conveying direction, the conveyance unit conveys original sheets of the first and third sheet types using the first conveyance path to the first sheet discharge tray, and conveys an original sheet of the fourth sheet type using the second conveyance path to the second sheet discharge tray.

5. The image reading apparatus as claimed in claim 2, further comprising a temperature sensor configured to detect temperature of the image reading apparatus, and wherein the control device is configured to set the sub-scanning magnification and at least one of the first parameter and the second parameter dependently on the temperature detected by the temperature sensor.

6. The image reading apparatus as claimed in claim 5, wherein as the temperature is higher, the first length of time and the second length of time are set shorter and the sub-scanning magnification is set higher.

7. The image reading apparatus as claimed in claim 1, wherein the image reading unit includes:

a first image reading unit disposed at a first reading position along the conveying path between the first and second conveyance rollers and configured to read one surface of the original sheet; and a second image reading unit disposed at a second reading position along the conveying path between the first and second conveyance rollers and configured to read another surface of the original sheet.

8. The image reading apparatus as claimed in claim 1, further comprising an operation unit configured to allow a user to input data indicative of a sheet size of the original sheet, and wherein the control device detects a sheet length of the original sheet based on the inputted data indicative of the sheet size, thereby determining the sheet type of the original sheet.

9. An image reading apparatus, comprising:

a sheet feed tray;

a supply roller configured to rotate while being in contact with an original sheet placed on the sheet feed tray and to send out the original sheet one sheet by one sheet to a conveyance path;

a conveyance unit including a first conveyance roller and a second conveyance roller and configured to convey, along the conveyance path, the original sheet that has been sent out by the supply roller to the conveyance path, the conveyance unit conveying the original sheet by using the first conveyance roller and the second conveyance roller in succession in this order;

a discharged-sheet receiving unit, into which the original sheet that has been conveyed by the conveyance unit is discharged;

an image reading unit disposed at a reading position along the conveyance path between the first conveyance roller and the second conveyance roller and configured to read an image, in a main scanning direction, from the original sheet conveyed by the conveyance unit at the reading position; and a control device configured to:

judge whether the original sheet is either one of a first sheet type, whose sheet length in a conveying direction along the conveyance path is longer than or equal to a first conveyance distance and shorter than a second conveyance distance, and a second sheet type, whose sheet length in the conveying direction along the conveyance path is longer than or equal to the second conveyance distance, the first conveyance distance being a distance between the first conveyance roller and the second conveyance roller along the conveyance path, the second conveyance distance being a distance between the supply roller and the second conveyance roller along the conveyance path;

set a sub-scanning magnification dependently on the judged result, the sub-scanning magnification indicating an enlargement or reduction ratio in a sub-scanning direction orthogonal to the main scanning direction that is to be applied onto an image to be read by the image reading unit; and control the image reading unit to read an image from the original sheet and generate image data indicative of the image read from the original sheet, and modify the image data by using the sub-scanning magnification.

\* \* \* \* \*